United States Patent [19]

Bodner et al.

[11] 4,077,060
[45] Feb. 28, 1978

[54] ASYMMETRICAL MULTIPROCESSOR SYSTEM

[75] Inventors: Ronald Eugene Bodner; Richard Craig Kiscaden, both of Rochester, Minn.

[73] Assignee: International Business Machines Corporation, Armonk, N.Y.

[21] Appl. No.: 754,390

[22] Filed: Dec. 27, 1976

[51] Int. Cl.$^2$ .................. G06F 15/16; G06F 15/20
[52] U.S. Cl. ................................................... 364/200
[58] Field of Search ............................... 364/200 MS

[56] References Cited
U.S. PATENT DOCUMENTS

| | | | |
|---|---|---|---|
| 3,229,260 | 1/1966 | Falkoff | 364/200 |
| 3,444,525 | 5/1969 | Barlow et al. | 364/200 |
| 3,566,358 | 2/1971 | Hasbrouck | 364/200 |
| 3,668,650 | 6/1972 | Wang | 364/200 |
| 3,766,532 | 10/1972 | Liebel, Jr. | 364/200 |

Primary Examiner—Harvey E. Springborn
Attorney, Agent, or Firm—Donald F. Voss

[57] ABSTRACT

An asymmetrical multiprocessor system has a main storage or macroprocessor connected under control of a microprocessor for initiation and termination of operation of the macroprocessor. The macroprocessor after being started by the microprocessor runs until a check condition in the macroprocessor occurs, a non-executable operation code (OP code) in the macroprocessor is encountered, or the microprocessor wants control. When the macroprocessor stops the microprocessor is interrupted. The interrupt routine handles the condition causing the interrupt and restarts the macroprocessor. Non-executable OP codes include supervisor call and invalid OP codes. I/O operations are handled by the supervisor call instruction.

15 Claims, 33 Drawing Figures

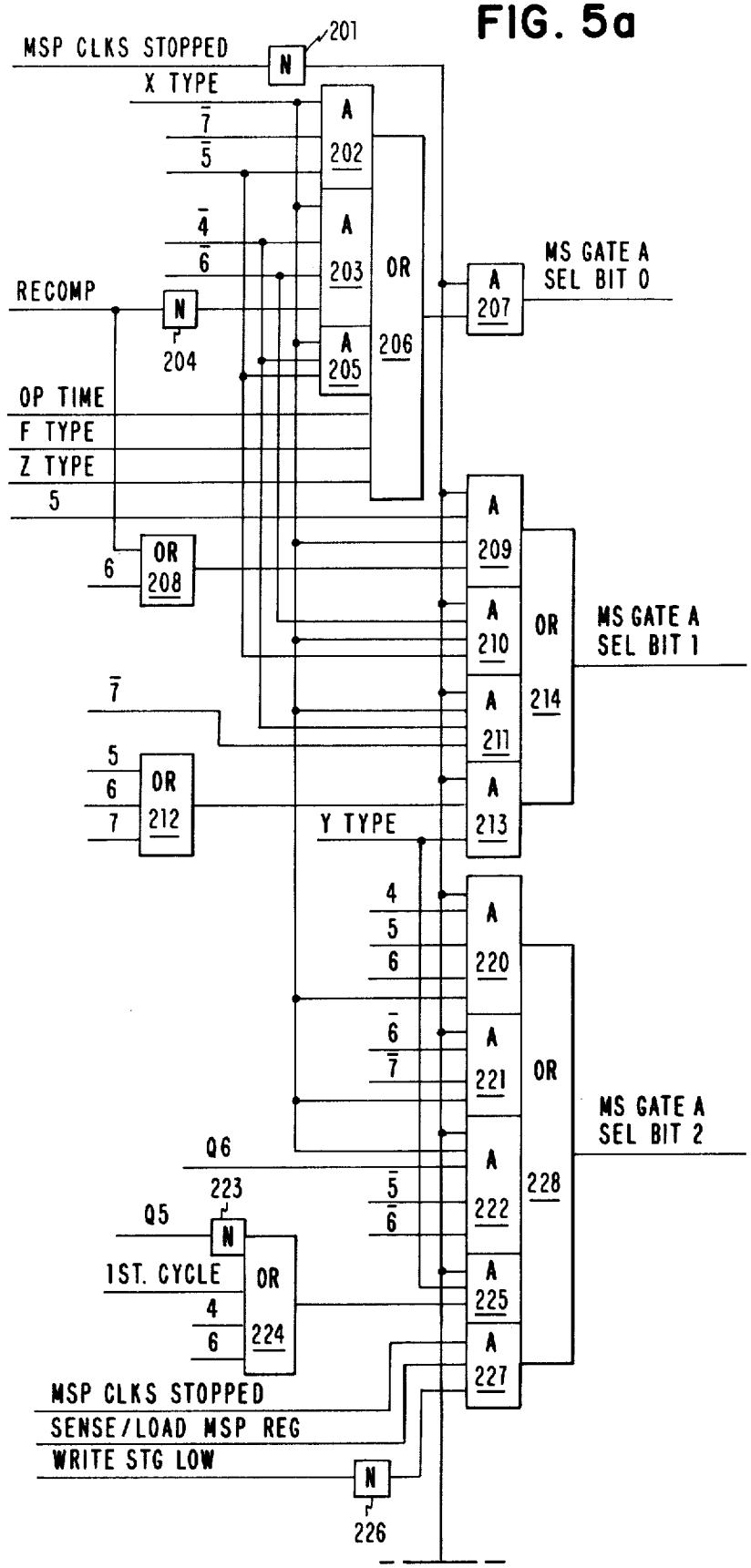

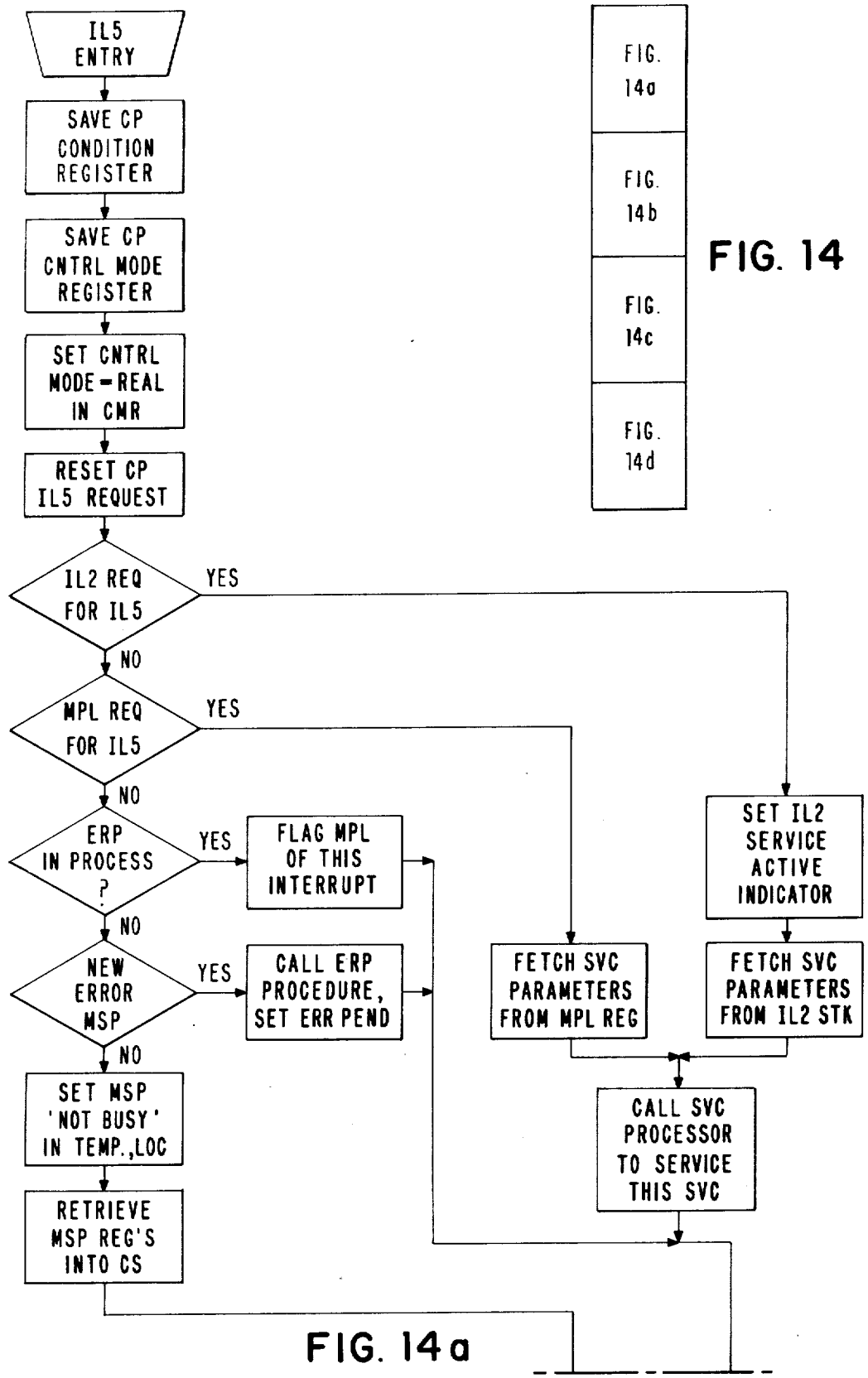

ASYMMETRICAL MULTIPROCESSOR SYSTEM

BACKGROUND OF THE INVENTION

1. Field of the Invention

The invention relates to asymmetrical multiprocessor computer systems and more particularly to such computer systems where one processor is a system language processor and another processor is a system control processor.

2. Prior Art

Asymmetrical multiprocessor computer systems are known but not where the main storage or system language processor is connected to run under control of a system control processor and runs until it encounters a predefined condition which causes interruption of the system control processor. The system control processor then handles the condition causing the interrupt and restarts the system language processor.

SUMMARY OF THE INVENTION

The principal objects of the invention are to provide an improved asymmetrical multiprocessing computer system which:

(a) minimizes the common resources accessed by the multiprocessors,
(b) minimizes time interference between processors of the multiprocessing system,
(c) minimizes control between processors of the multiprocessing system, and
(d) minimizes interference with system language processor during system control functions such as I/O supervision or task management.

The foregoing objects of the invention are achieved by dividing the functions of the processors whereby one processor is structured as a system language or main storage processor and another processor is structured as a control processor. The control processor executes microinstructions to perform system control functions such as input output supervision and control and task dispatching for the main storage processor. The control processor also performs system control operations of the type associated with Supervisor Call (SVC). By this function split the common resources accessed by both processors is minimized. The most frequently used common resource is main storage, but the contention is minimized because the microprocessor has a control storage for its own program and data. The microprocessor accesses main storage in a cycle stealing fashion where the system language processor is halted between machine cycles and a main storage cycle is granted to the microprocessor. Blocks of storage containing control information become associated for use by one of the processors. This minimizes the locking requirements on these control block resources.

The control processor accesses main storage on a cycle steal basis, i.e., the main storage processor is halted between machine cycles and a main storage cycle is granted to the control processor. The control processor when executing a main storage instruction goes into a wait mode at the clock time just prior to the required storage access and waits for the storage cycle which otherwise would have been available to the main storage processor. This arrangement minimizes time interference between the processors.

The lowest priority interrupt level in the control processor is assigned to handle machine check, console service, and non-executable operation codes for the main storage processor. The control processor can also invoke this interrupt level by a service request. Service request includes I/O service requests, console service requests, instruction step mode service requests and main storage address compare stop service requests. This request and response mechanism minimizes the controls required between the two processors.

BRIEF DESCRIPTION OF THE DRAWINGS

FIGS. 5a, 5b, 5c and 5d arranged as in FIG. 5 form a logic diagram illustrating the gate control logic in the MSP;

FIGS. 14a, 14b, 14c and 14d taken together as in FIG. 14 constitute a flow diagram of interrupt level 5 (IL5) operation; and, FIG. 14 is a diagram illustrating the arrangement of FIGS. 14a, 14b, 14c, and 14d.

DESCRIPTION

Figure 1:
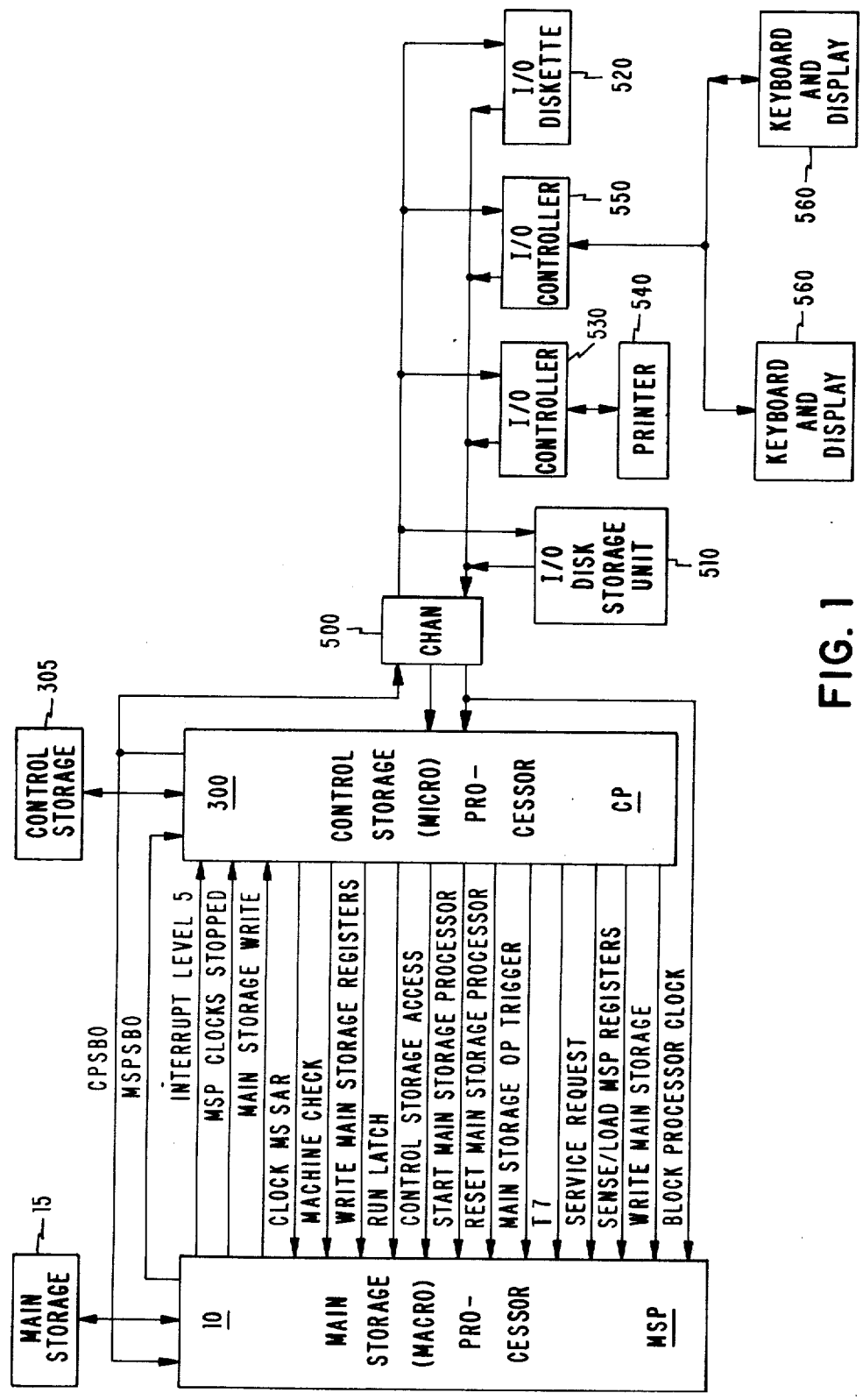
FIG. 1 is a block diagram illustrating the invention.

With reference to the drawings and particularly to FIG. 1 the invention is illustrated by way of example as including a main storage processor (MSP) 10 and a control storage processor (CP) 300. Processor 10 processes IBM System/3 type instructions. The format of the System/3 type of instruction is set forth in manuals entitled IBM 5410 Processing Unit Theory of Operation, copyrighted 1969, 1970, 1971 by International Business Machines Corporation (Form No. SY31-0207-2), IBM 5410 Processing Unit Diagrams, copyrighted 1969 by International Business Machines Corporation (Form No. SY31-0202-2) and 5415 Processing Unit Models A and B Theory-Maintenance-Diagrams, copyrighted 1974, 1975 by International Business Machines Corporation (Form No. SY31-0367-2) all incorporated herein by reference. Processor 10, as it will be seen in detail later herein, is a variable cycle and variable cycle length processor. Instructions are fetched by fetching one byte of the instruction at a time and bytes are fetched successively to completely fetch the instruction. A byte consists of eight binary bits with parity as described in the aforementioned references. The instructions are stored in main storage 15 which also stores data for both processors 10 and 300.

Control processor 300 processes IBM System/32 type microinstructions. The format of the System/32 type microinstructions is set forth in a manual entitled IBM Maintenance Library System/32 Theory-Diagrams, copyrighted 1975 by International Business Machines Corporation (Form No. SY31-0346-0) which is incorporated herein by reference. As constrasted to processor 10, the microinstructions are of fixed length and the entire instruction is fetched at one time or during a single access of control storage 305 which stores the microinstructions. Processor 300 can access both main storage 15 and control storage 305; however, processor 10 can only access main storage 15.

Control processor 300 initiates operation of main storage processor 10. Once initiated, processor 10 runs until it encounters a halt condition or control processor 300 wants service. The halt conditions are machine check, console service, main storage address compare, I/O service request, and non-executable instructions. Input/output (I/O) instructions among other instructions, are defined as non-executable instructions. The halt condition in the main storage processor 10 invokes an interrupt request in the control processor 300. The control processor 300 handles the halt condition and then restarts the main storage processor 10.

The system input/output (I/O) devices are connected to control processor 300 via a channel 500 in much the same manner that I/O devices are connected to IBM System/32. Control processor 300 can take the form of a System/32 processor which is modified to control main storage processor 10. I/O Disk Storage Unit 510 and I/O Diskette 520 attach directly to channel 500, whereas printer 540 and keyboard and display terminal 560 are attached via I/O controllers 530 and 550 respectively.

The control processor (CP) 300 is initialized by reading data from disk storage unit 510 into control storage 305. The initializing data is permanently stored on disks in the disk storage drive unit 510. The initializing operation is well known and is usually referred to as initial microprogram load or IMPL. the supervisor control program loaded into control storage 305 then is executed to initialize main storage processor (MSP) 10 and also to initialize programs in main storage 15. The MSP 10 is initialized by CP 300 during IMPL. The CP 300 transfers a system reset signal to the reset main storage processor line. The MSP 10 is responsive to this signal and resets MSP registers and MSP clocks. The MSP registers will be described in detail later herein.

Control processor 300 accesses main storage by fetching a main storage microinstruction and in this instance in order to initialize main storage the microinstruction is a main storage write instruction. During execution of the main storage write microinstruction a not control storage access signal is generated and transmitted to the main storage processor. The control processor clocks are caused to loop so as to remain in a particular time state. The MSP responds to the not control storage access signal whereby the MSP clocks are stopped and a MSP clocks stopped signal is generated and transmitted to the CP. The CP uses the MSP clocks stopped signal for synchronization and generates a main storage OP trigger signal which is transmitted to the MSP. The main storage OP trigger signal also takes the CP clocks out of the loop state and gates a clock MS SAR signal from the CP to the MSP. The clock MS SAR signal clocks the data on the CPSBO bus into MS SAR for addressing main storage. The CP provides a write main storage signal for entering the data on CPSBO into main storage at the addressed location. The data on CPSBO is also wrapped back to the CP via the MSPSBO which is connected to main storage. The wrap back is for data checking purposes. The CP then continues to fetch and execute main storage write instructions until main storage 15 is completely initialized.

It is also necessary to initialize registers in the MSP. This initialization is accomplished by means of the CP fetching and executing sense/load MSP register instructions. The signals involved in the initialization of the MSP registers are similar to those involved for initializing main storage. During execution of a sense/load MSP register instruction in the CP a not control storage access signal is generated and transmitted to the MSP. The CP clocks are caused to loop so as to remain in a particular time state. The MSP responds to the not control storage access signal whereby the MSP clocks are stopped and a MSP clocks stopped signal is generated and transmitted to the CP.

The CP uses the MSP clocks stopped signal for synchronization and generates a main storage OP trigger signal which is transmitted to the MSP. The main storage OP trigger signal also takes the CP clocks out of the loop state and gates a clock MS SAR signal from the CP to the MSP. The CP places an address on CPSBO which is then clocked into the MS SAR in the MSP by the clock MS SAR signal from the CP. The address in MS SAR however in this instance is used for addressing one of the registers in the MSP. The data to be entered into the selected MSP register is transferred from the CP over CPSBO. The data is entered under control of a write MS register signal generated by the CP and transmitted to the MSP.

With main storage 15 and registers in the MSP initialized the user program set into main storage can be executed by the MSP. The CP however must start the MSP. The CP first executes a microinstruction for generating the reset main storage processor signal. This signal causes the MSP to reset the MSP registers and the MSP clocks. The CP then executes a microinstruction for generating a start main storage processor signal. The MSP 10 is responsive to this signal for initiating the fetching of a MSP instruction from main storage 15. The MSP executes the fetched instruction and continues to fetch and execute MSP instructions until it encounters a check condition, a non-executable instruction, or receives a service request signal from the CP. Any of these conditions will cause the MSP 10 to stop its clocks and to generate an interrupt level 5 request signal.

The interrupt level 5 request signal is transmitted to the CP 300. The condition which caused the generation of the interrupt level 5 signal is sent from the MSP to the CP via the MSPSBO bus. Of course, if the CP had caused the interrupt level 5 to occur by the generation of a service request signal it already knows of the condition which caused the generation of the interrupt level 5 signal. Thus, interrupt level 5 in the CP is used for handling check conditions, non-executable instructions, and service request. The check conditions which can occur in the MSP are typical CPU type check conditions, i.e. parity check, invalid OP code and invalid Q code. the non-executable instructions in the MSP are of three types. One type is the supervisor call (SVC) instruction which is reserved for supervisory functions. A second type is a supervisor call (SVC) instruction for I/O functions. Hence, the CP performs the supervisor and I/O functions for the MSP. The other or third type of non-executable instruction is an invalid instruction. An invalid instruction is an error condition and causes the task in process to be terminated. The service request signal generated by the CP is a means by which the CP stops the MSP. The CP stops the MSP by means of the service request signal when the main storage address compare stop latch is set. This is generally used for system servicing. The CP can also stop the MSP when the I/O service request latch is set and this is used for task switching. If the console service latch is on, the CP stops the MSP and causes the MSP to execute a particular program. A mode selector switch is also available for stopping the MSP by generating service request. The console service latch is also used for controlling the MSP for single instruction execution.

In addition to transferring data from I/O devices under program control by means of the supervisor call instruction I/O devices having cycle steal capability can steal either a control storage cycle or a main storage cycle. When an I/O device wants a cycle steal it generates a signal called block processor clock (BPC). This signal is received by both the CP and the MSP. The BPC signal stops the clocks in the CP and the CP generates a T7 timing signal. The T7 timing signal is sent back to the I/O device and the the MSP. The I/O device upon receiving the T7 timing signal sends a cycle steal request signal to the CP. This cycle steal request signal causes the CP to generate a load SAR signal. The I/O device provides signals indicating whether the storage cycle is a control storage cycle or a main storage cycle. If the cycle to be taken is a main storage cycle the CP generates a not control storage access signal. The not control storage access signal is sent to the MSP for stopping its clocks. The MSP returns the MSP clocks stopped signal to the CP. This causes the CP to generate the main storage OP trigger signal. The load SAR signal together with the main storage OP trigger signal causes the CP to provide the MSP with a clock MS SAR signal. The clock MS SAR signal loads the MSAR register in the MSP with a main storage address sent by the CP from a local storage register in the CP selected by the I/O device. The address is sent by the CP to the MSP on CPSBO. Then if the operation is a write data operation the data is transferred from the I/O device to main storage via CPSBO and the data is written into the addressed location under control of a write main storage signal from the CP. The write main storage signal is generated in the CP in response to the main storage OP trigger signal also generated in the CP. If the main storage operation is a read operation the data read from the addressed location is entered into a storage data register (SDR) in the CP and then gated to the I/O device requesting the cycle steal.

When the I/O device indicates that the cycle steal operation is for control storage 305 rather than main storage 15 the CP generates a control storage access signal upon receiving the block processor clock signal from the I/O device. The CP completes the current instruction and then stops its instruction clocks with the block processor clock signal and generates the T7 timing signal which is sent to the I/O devices and to the MSP. The MSP continues to run, however, because of the presence of the control storage access signal. Hence, the MSP does not send the MSP clocks stopped signal to the CP and the CP does not generate the main storage OP trigger signal. The I/O device upon receiving the T7 signal, provides the CP with the cycle steal request signal. The CP uses the cycle steal request signal to generate a storage function signal and a clock SAR signal. The CP storage clocks are conditioned to run due to the absence of the not control storage access signal. The clock SAR signal loads the address from the selected LSR in the CP into the storage address register in the CP. The storage function signal generated within the CP starts the CP storage clocks. If the operation is a write operation, the I/O device provides data on channel system bus in via a storage gate to control storage and the data is written into the addressed location. If the operation is a read operation, data is read from the addressed location and sent to the I/O device via the storage gate and channel system bus out.

From the foregoing it is generally seen how the CP starts the MSP whereby the MSP executes instructions until it encounters a check condition, a non-executable instruction, or a service request from the CP. Any of these three conditions causes the MSP to generate an interrupt level 5 signal which is transmitted to the CP. The CP determines the condition which caused the MSP to stop and handles the interrupt condition and then restarts the MSP. This sequence of events is indicated in FIGS. 14a–14d. I/O devices can cycle steal either a main storage or control storage cycle. If a control storage cycle is taken, then the MSP continues to run concurrently with the CP.

The MSP is shown in detail in FIGS. 2a, 2b, 2d and 2f. Main storage 15 can be addressed by a 16 bit address contained in the main storage address register MSAR 11 or by an expanded address consisting of a combination of bits from MSAR 11 and bits from address translation registers 12 which are applied to main store address decode circuitry 13. Data passes from main storage a byte at a time and can be entered onto OP code register 20 or passed via gate control 25 to a Q back up register 27, a processor status register 29, a control processor gate 30 or to LSR gate 35.

Main storage 15 contains the instructions for the MSP. The instruction formats for the MSP instructions are contained on page 1–12 of the IBM 5415 Processing Unit, Models A and B Theory-Maintenance Diagrams manual referred to above. Every MSP instruction has a one byte OP code which specifies the addressing mode and operation to be performed and is entered into register 20 during the I fetch phase of instruction processing. The OP code is decoded by the instruction function, decode and control logic contained in block 100. Details of this logic which are pertinent to the present invention are shown in FIG. 4 and will be described later herein. The details of the instruction function decode and control logic 100 for decoding executable instructions is not contained herein in that the logic would be substantially as set forth in the references mentioned above.

Every MSP instruction also has a one byte Q code which is entered into Q register 28 via the Q back up register 27. The Q code functions to further define the instruction. The Q code for example can define field length, immediate data, register selection, bit selection, branch conditions, device address and data selections, and half byte selection. Thus the output of the Q register 28 is also applied as an input to the instruction function decode and control logic 100 as well as to status gate 35. The Q back up register 27 is used for certain instructions whenever a recomplement cycle is required.

The other byte or bytes of an instruction vary depending upon the type of instruction. It is thus seen that a MSP instruction is fetched a byte at a time and successive fetches are made to completely fetch the instruction. After the instruction has been fetched, instruction execution takes place. Instruction execution time consists of three major times referred to as EA, EB, and EC times. EA time consists of three cycles, each cycle being 200ns in length. EB time has either a three or a four cycle duration and EC time has a three cycle duration.

During instruction handling operands fetched from main storage 15 are passed by control gate 25 to LSR gate 35 and from LSR gate 35 directly into X low register 41 and Y register 42. Registers 41 and 42 feed arithmetic and logic unit (ALU) 45. The output of ALU 45 is applied to ALU gate 46 and to main storage gate 47. ALU gate 46 feeds LSR gate 35 while main storage gate 47 feeds main storage via OR circuit 48. OR circuit 48 is also fed by main storage gate 49 which connects to CPSBO.

LSR gate 35 also feeds 16 bit LSR registers 36 which are selected under LSR control logic. The high byte of an LSR register 36 can be fed into X high register 40, to main storage gate 47 or to MSAR 11. The low byte of an LSR register 36 can be fed to X low register 41, to Y register 42, to main storage gate 47, or to MSAR 11. Although the outputs of the LSR's 36 are applied to various registers and gates, the data therefrom is passed into a register or passed by a gate only if the register is clocked to receive the data or if the gate is operated to pass the data. The control gate 25, status gate 38, sense byte gate 39, storage gates 47 and 49 are controlled by gate control logic 200.

The CPU clocks and storage clocks represented by block 50 provide signals for operating the MSP 10 and main storage 15. The control processor 300 contains the system oscillator 301 which in addition to supplying oscillator pulses to control processor 300 also provides oscillator pulses to CPU clocks and storage clocks 50 which are shown in greater detail in FIG. 3. The CPU clocks of block 50 are exclusively used by MSP 10. The storage clocks, however, can be used by the MSP 10, CP 300 or by the I/O devices.

The pulse from oscillator 301 is applied to the clock inputs of triggers 51, 56, 59, 61, and 64. Triggers 56, 59, 61 and 64 essentially form the main storage clocks. The oscillator pulse is also applied to AND circuit 53 and to inverter 57. The output of inverter 57 is used to clock a trigger 52. The data input of trigger 52 is connected to the reset output of trigger 51 which also has its data input connected to its reset output. By this arrangement trigger 51 is clocked on with the leading edge of the oscillator pulse and thereafter trigger 52 is clocked on with the trailing edge of the oscillator pulse. The leading edge of the next oscillator pulse turns trigger 51 off and the trailing edge of that oscillator pulse turns trigger 52 off.

Triggers 51 and 52 function as phase triggers for providing pulses to the MSP clocks and to the instruction function decode and control logic 100. The data inputs of the storage clock triggers 56, 59, 61, and 64 are essentially controlled by storage function latch 55. This latch is set under control of OR circuit 54. OR circuit 54 is connected to receive the clock MS SAR signal from CP 300 and a main storage function signal, MS STG FUN, from instruction function decode and control logic 100. Storage function latch 55 is reset under control of the reset MSP signal and also under control of the set output of END trigger 64.

The set output of latch 55 is directly connected to the data input of CSX trigger 56. Thus, trigger 56 will be the first trigger to be set on by a clock pulse from oscillator 301. The reset output of trigger 56 is applied to AND invert circuit 58 which also receives an input from inverter 57. AND invert circuit 58 controls the reset input of CSY trigger 59. The data input of CSY trigger 59 is directly connected to the set output of latch 55. Hence, CSY trigger 59 is the next trigger to be set on by the oscillator pulse. The set output of trigger 59 feeds AND circuit 60 which also receives the set output of storage function latch 55. AND circuit 60 controls the data input of write trigger 61. The set output of trigger 61 is applied to AND circuit 63 which controls the data input of END trigger 64. The other input into AND circuit 63 is from the set output of storage function latch 55.

Figure 12:
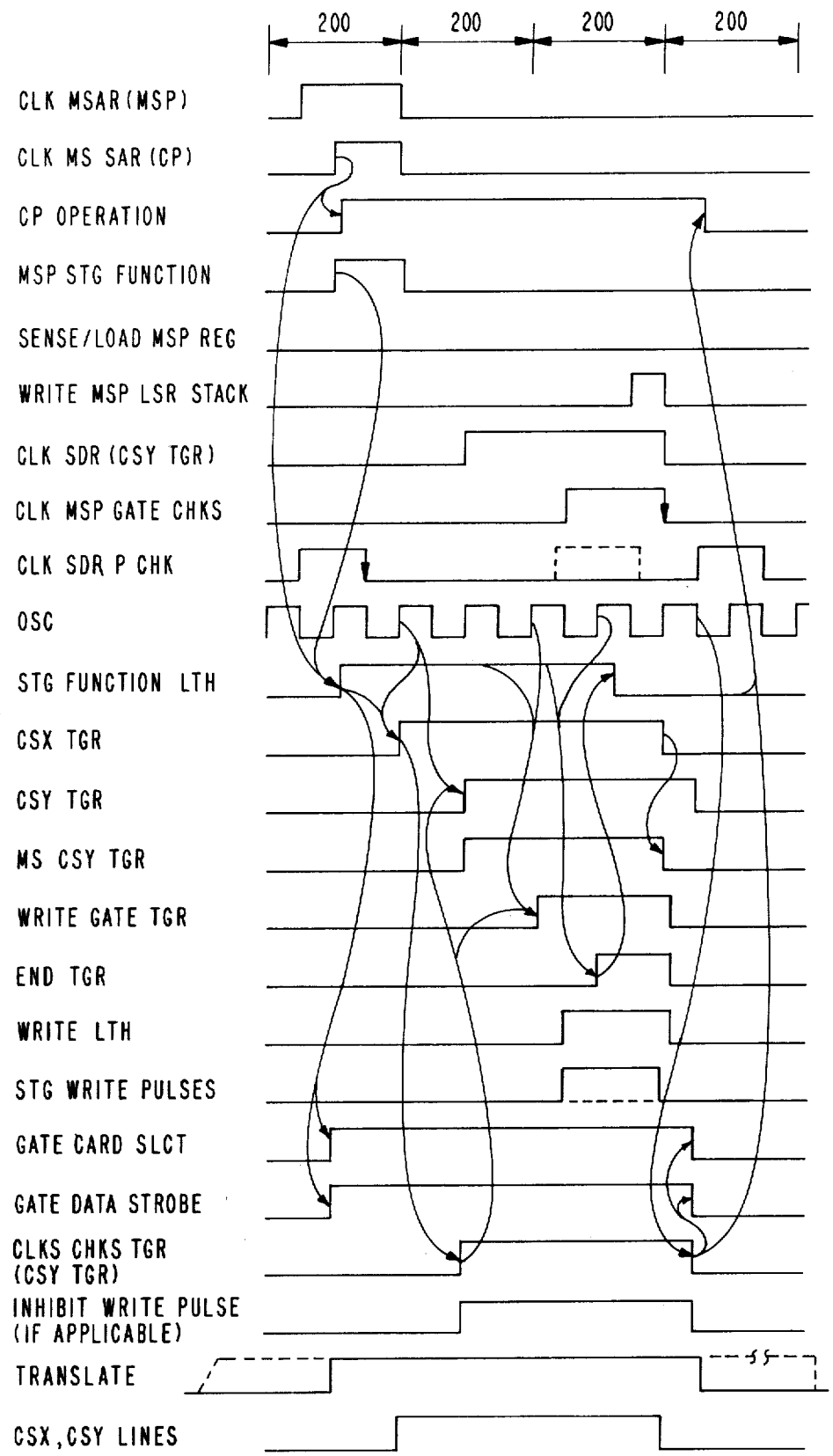
FIG. 12 is a timing diagram illustrating timings for a main storage access.

The pulses from triggers 56, 59, 61 and 64 are shown in FIG. 12. In addition to these pulses AND circuit 62 generates a MS CSY trigger signal from inputs from triggers 56 and 59. Write storage strobe pulses are taken from AND circuit 68. This AND circuit has inputs from write trigger 61, latch 67 and instruction function decode and control logic 100. Latch 67 is set under control of AND circuit 66 and reset under control of inverter 65. Inverter 65 receives a MS CSY Trigger signal from AND circuit 62. AND circuit 66 is connected to receive a write main storage signal from CP 300, a signal from write trigger 61, a signal from inverter 57 and a INHIBIT STG WRITE pulse signal from instruction function decode and control logic 100. It is thus seen that the storage clocks can be controlled by the MSP 10, the CP 300, or by the I/O devices. When the storage clocks are controlled by the MSP, the instruction function decode and control logic 100 provides the MS STG FUN signal and when controlled by a CP or the I/O devices the CP provides the CLK MS SAR signal.

Figure 2A:
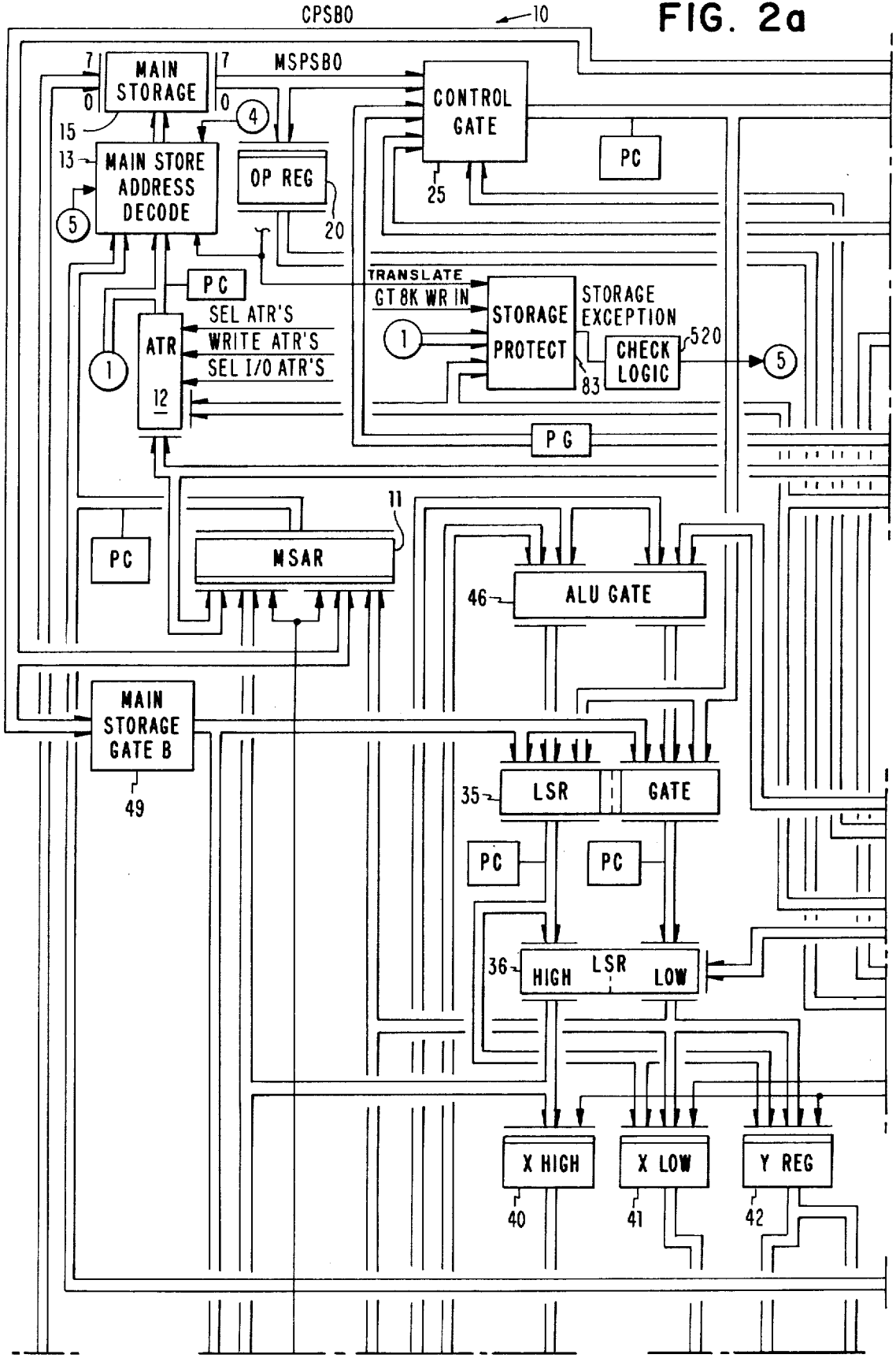
FIGS. 2a, 2b, 2c, 2d, 2e and 2f taken together as shown in FIG. 2 form a block diagram of the data and signal paths within and between the main storage processor (MSP) and the control processor (CP)
Figure 2B:
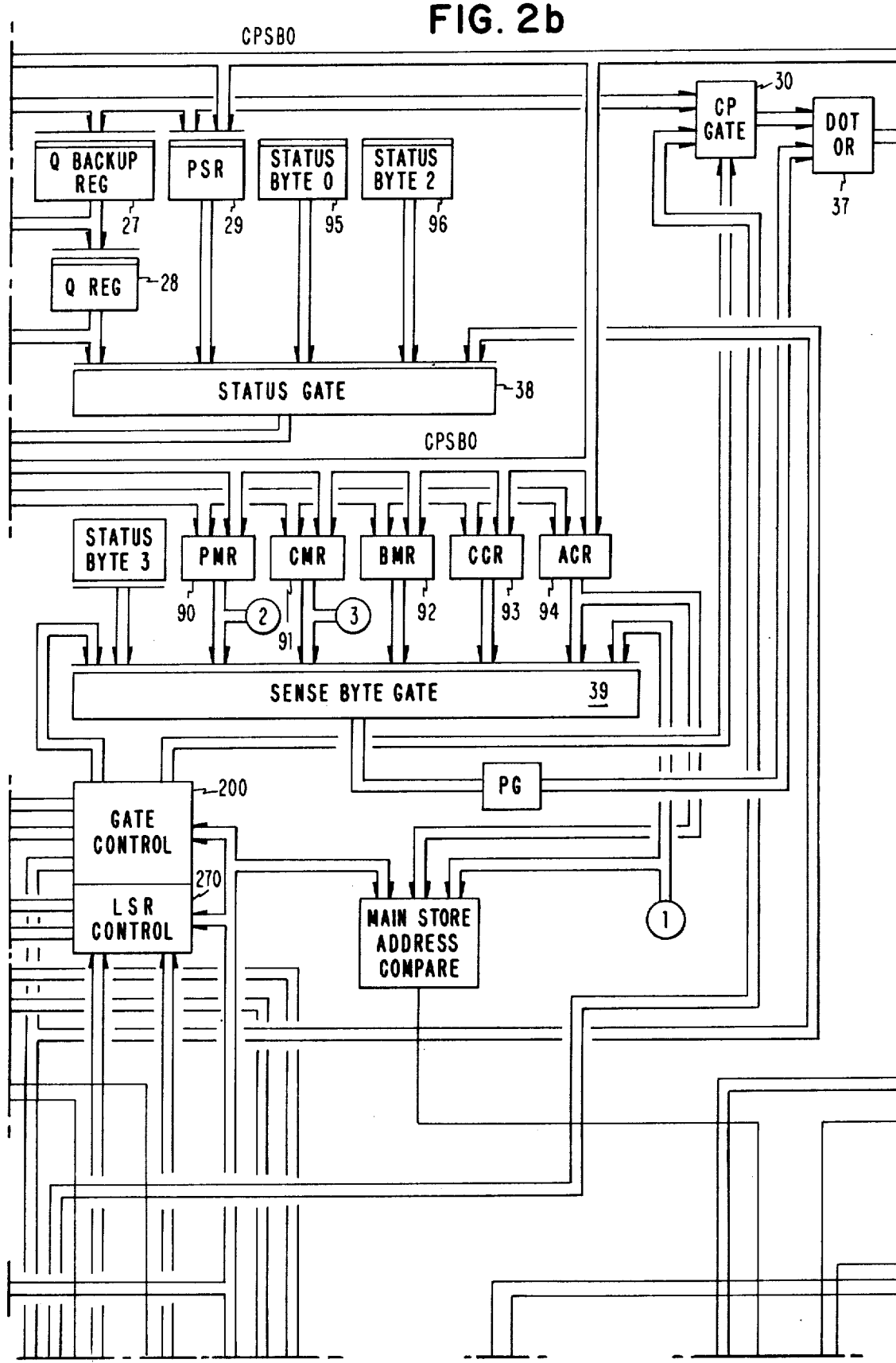
Figure 2C:
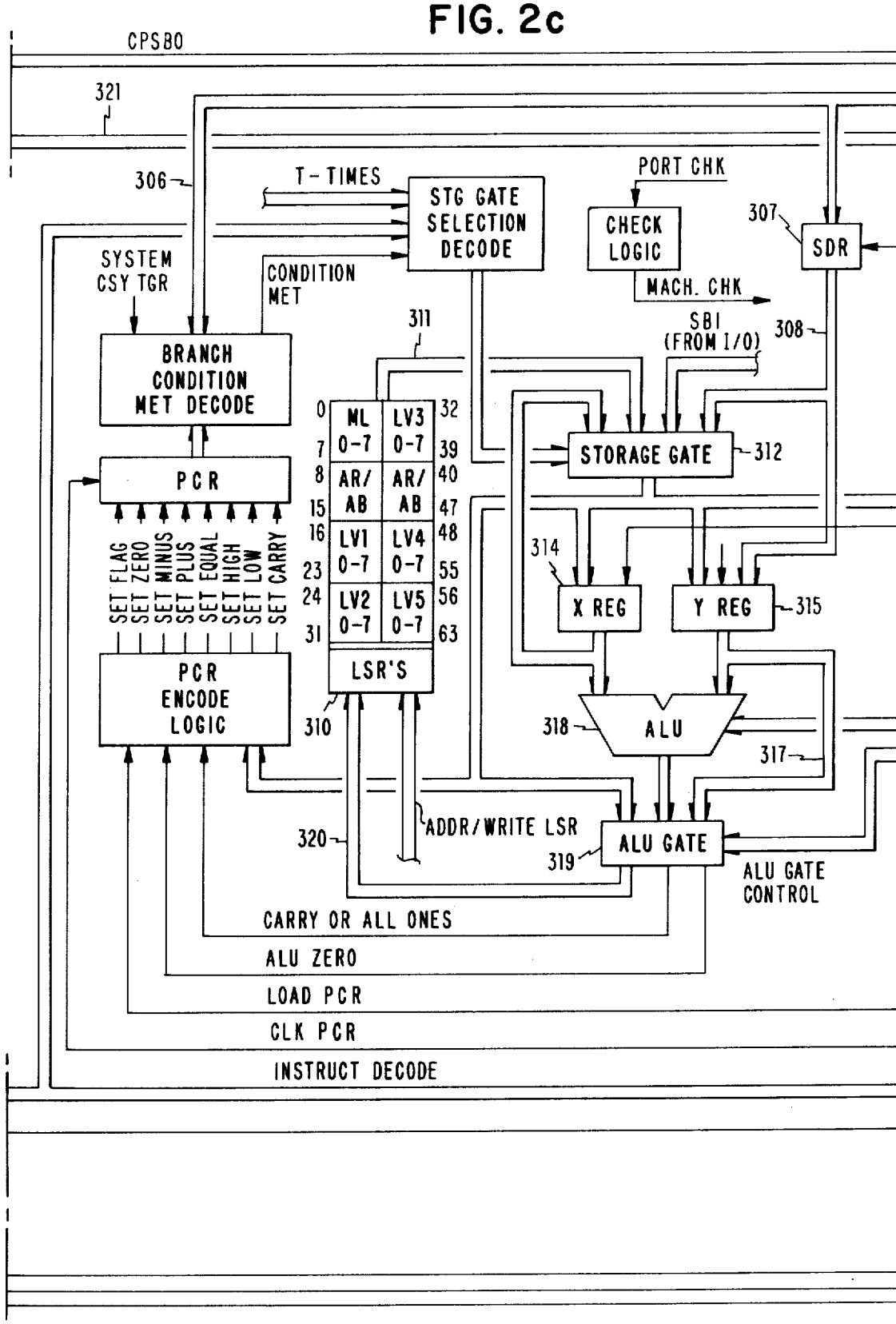
Figure 2D:
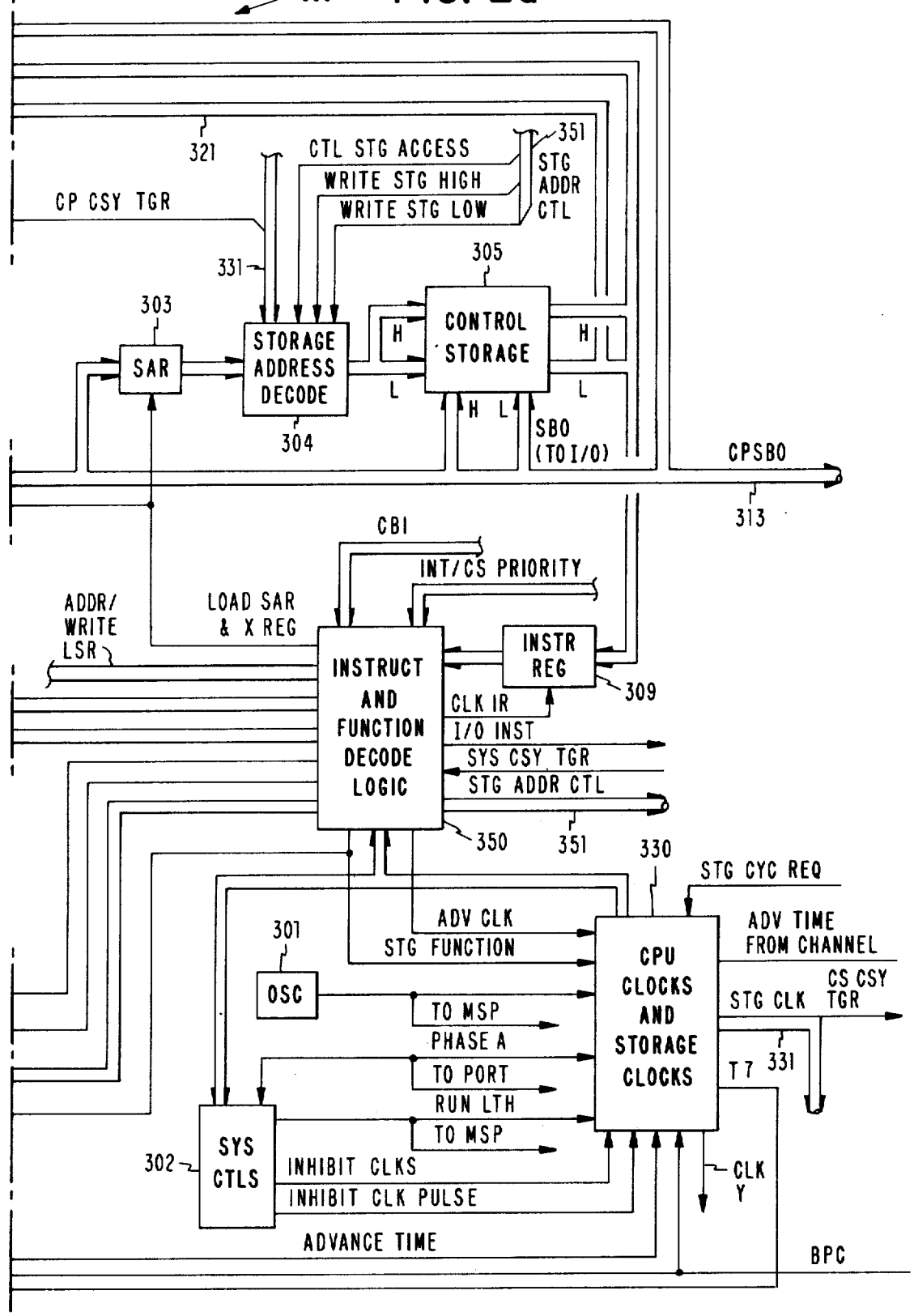
Figure 2E:
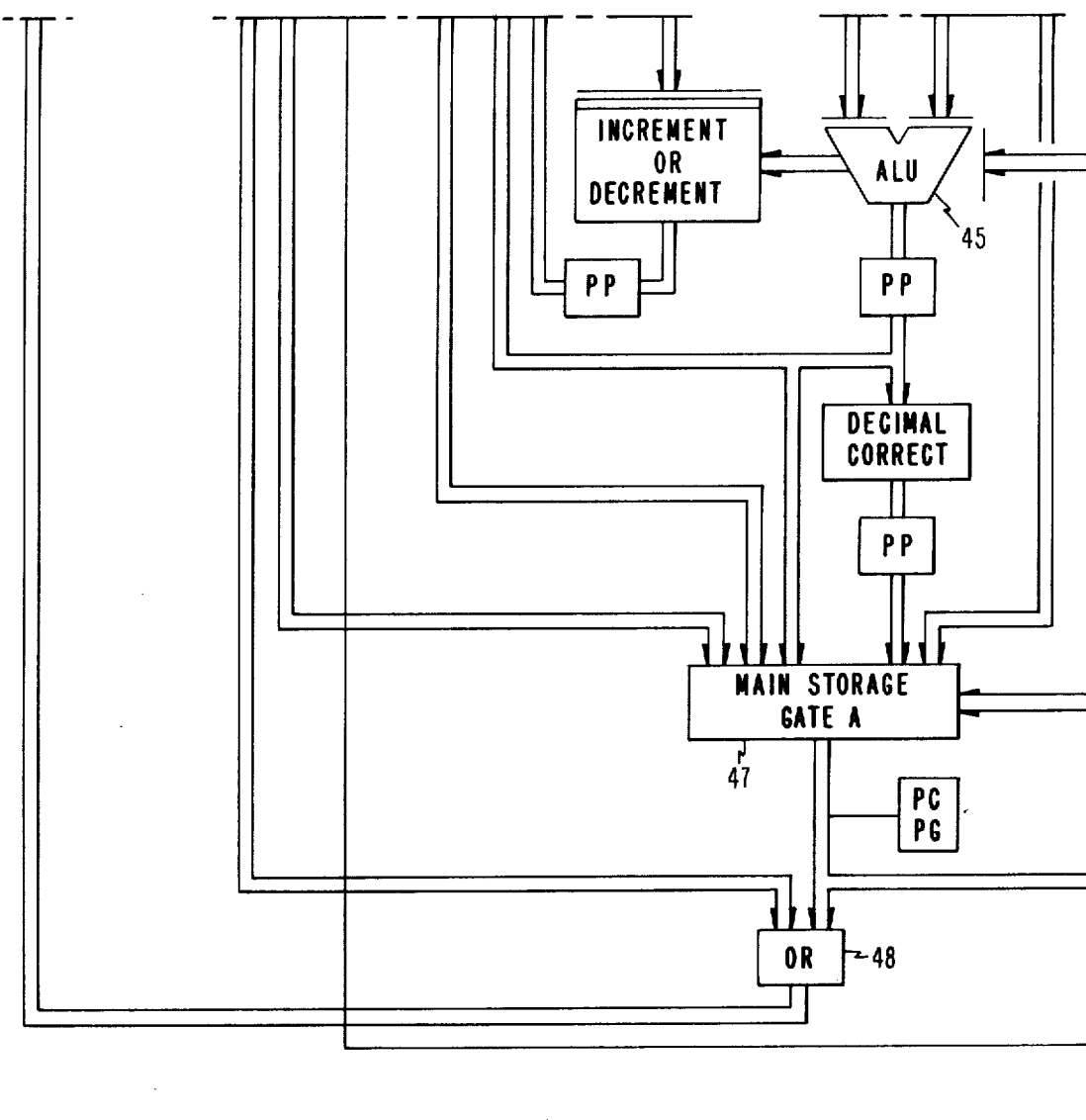
Figure 2F:
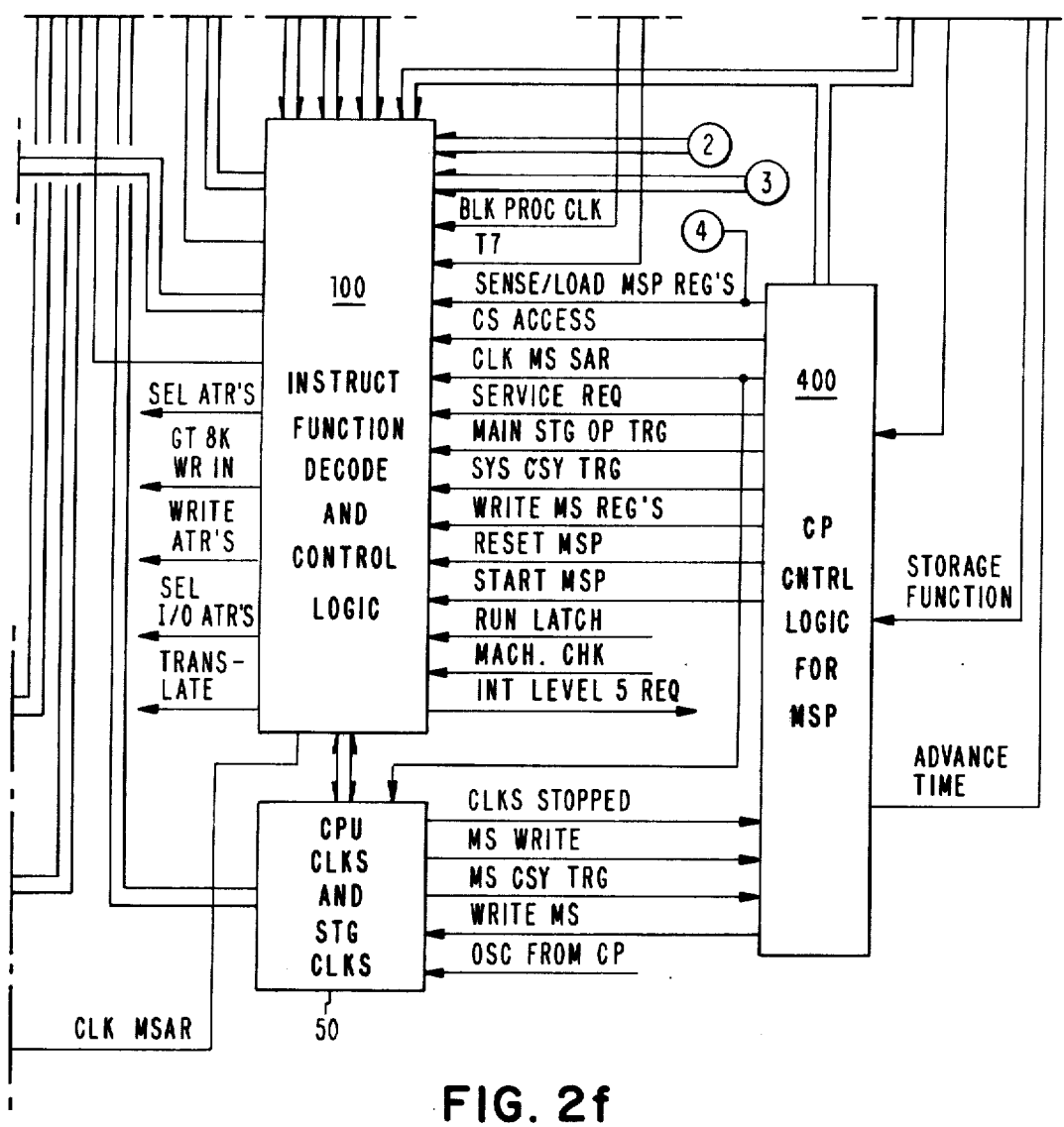
Figure 2:
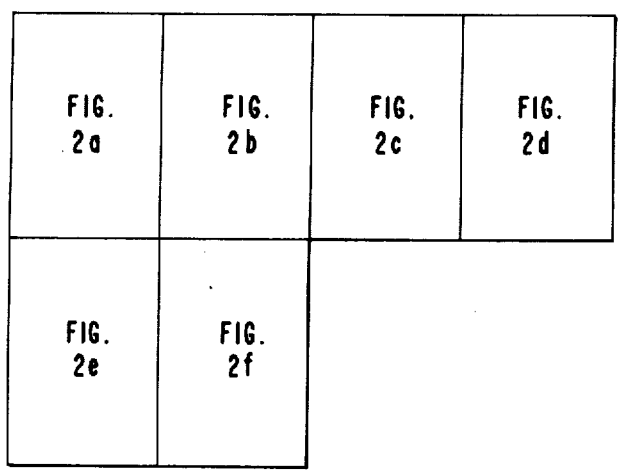
FIG. 2 is a diagram illustrating the arrangement of FIGS. 2a, 2b, 2c, 2d, 2e, and 2f.
Figure 3A:
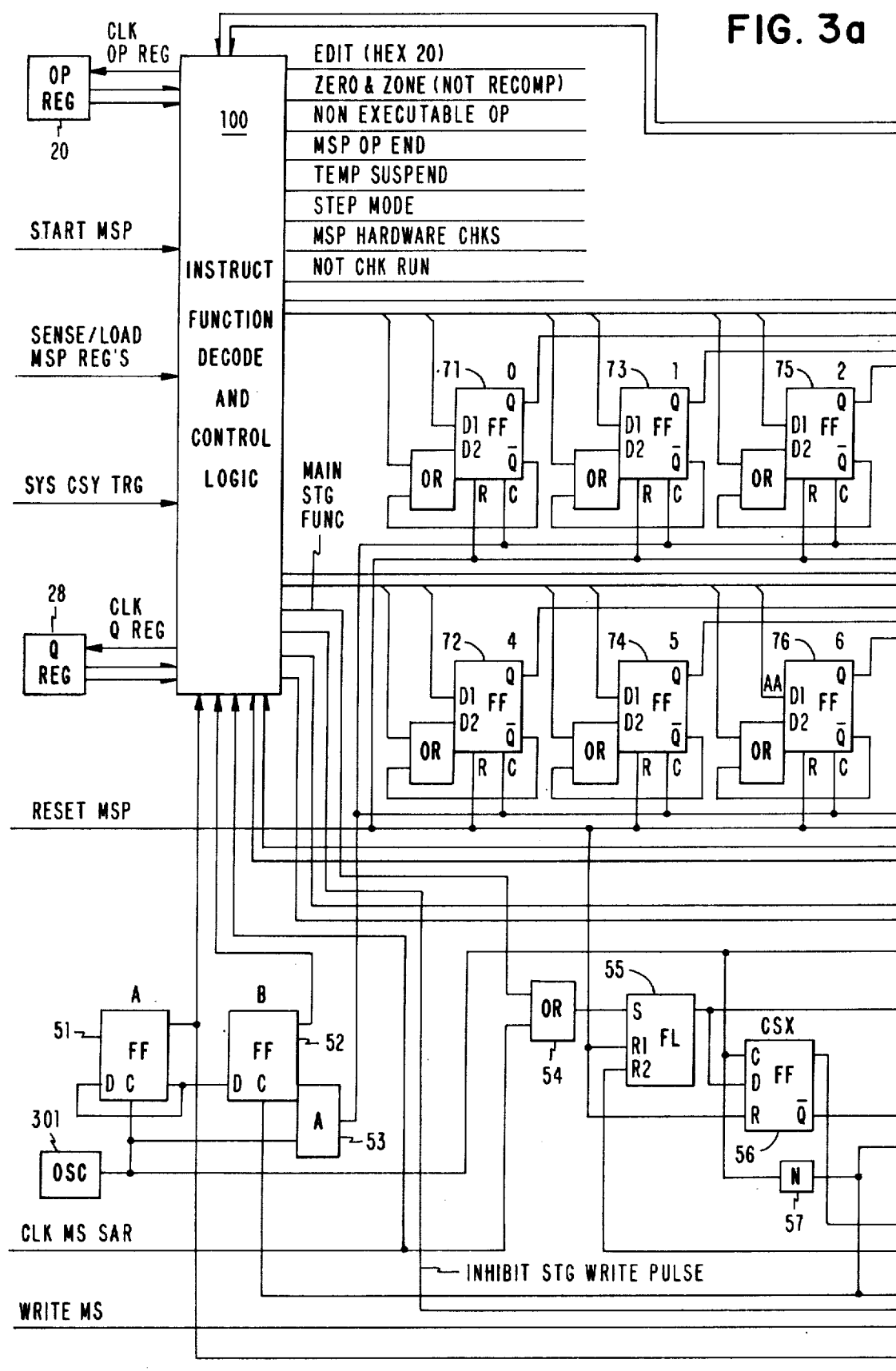
FIGS. 3a and 3b taken together with FIG. 3a disposed to the left of FIG. 3b form a logic diagram illustrating the CPU and storage clocks and system controls of the MSP.
Figure 3B:
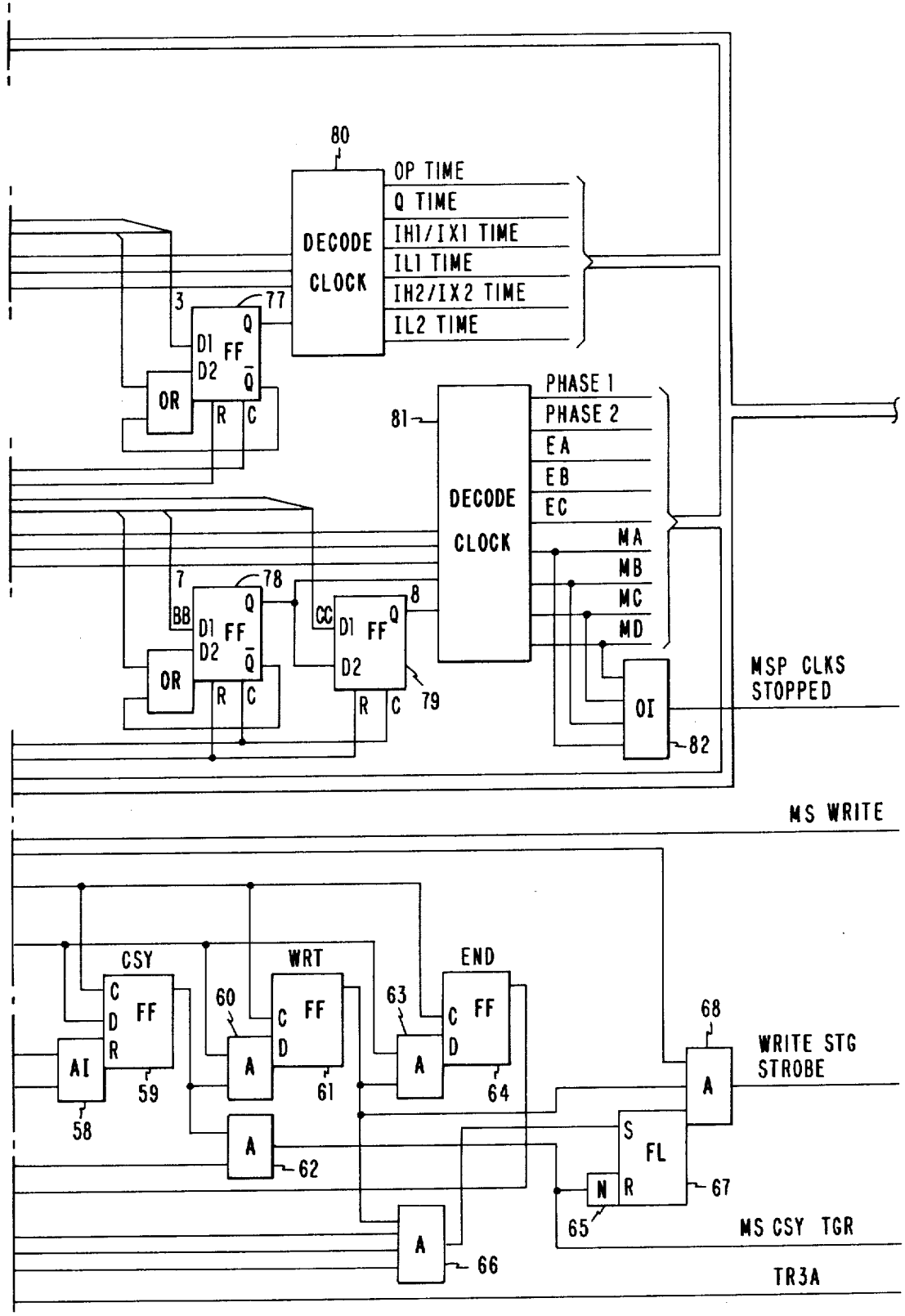

The CPU clocks of block 50 FIG. 2f include triggers 71–79, inclusive shown in FIGS. 3a and 3b. Triggers 71, 73, 75, and 77 are controlled according to the type of addressing indicated in the OP code contained in OP register 20 and by the Q code in register 28. Triggers 72, 74, 76, 78, and 79 are instruction dependent. Thus, the triggers 71–79, inclusive, receive control signals from instruction function decode and control logic 100. These control signals are applied to the data inputs of the triggers. The clock inputs of the triggers are connected to receive pulses from the output of AND circuit 53. AND circuit 53 receives an oscillator pulse and the reset output of trigger 52.

Triggers 71, 73, 75 and 77 feed clock decode 80 and triggers 72, 74, 76, 78, and 79 feed clock decode 81. Clock decodes 80 and 81 are represented as being separate decode blocks but the representation is immaterial to the invention. Clock decode 80 includes logic circuitry for generating an OP time signal which is the AND of the output from trigger 71 and the not output of trigger 73. OP time is 600ns in duration and is used for controlling the decode of the OP code. Q time is the AND of the output from trigger 73 and the not output of trigger 75. Q time is used for moving the Q byte from storage 15 to Q register 28. IH1/IX1 time is the AND of trigger 75 and not trigger 77. IH1 time is used for the high order byte of the first operand address for addressing the high order byte of OP 1 when the first operand is directly addressed. IX1 time is used for the first operand address in OP 1 when the first operand is addressed by base displacement. IL1 time is the AND of trigger 71 and trigger 77. IL1 time is used for the low order byte of the first operand address for addressing the low order byte of OP 1 when the first operand is directly addressed. IH2/IX2 time is the AND of not trigger 71 and trigger 73. IH2 time is for the high order byte of the second operand address for addressing the high order byte of OP 2 when the second operand is directly addressed. IX2 time is for the second operand address in OP 2 when the second operand is addressed by base displacement. IL2 time is the AND of not trigger 73 and trigger 75. IL2 time is for the lower byte of the second operand address for addressing the low order byte of OP 2 when the second operand is directly addressed. The OP, Q, IH1, IX1, IL1, IH2, IX2 and IL2 times taken together in different combinations as dictated by the type of instruction being fetched form the instruction or I-fetch phase.

Figure 13:
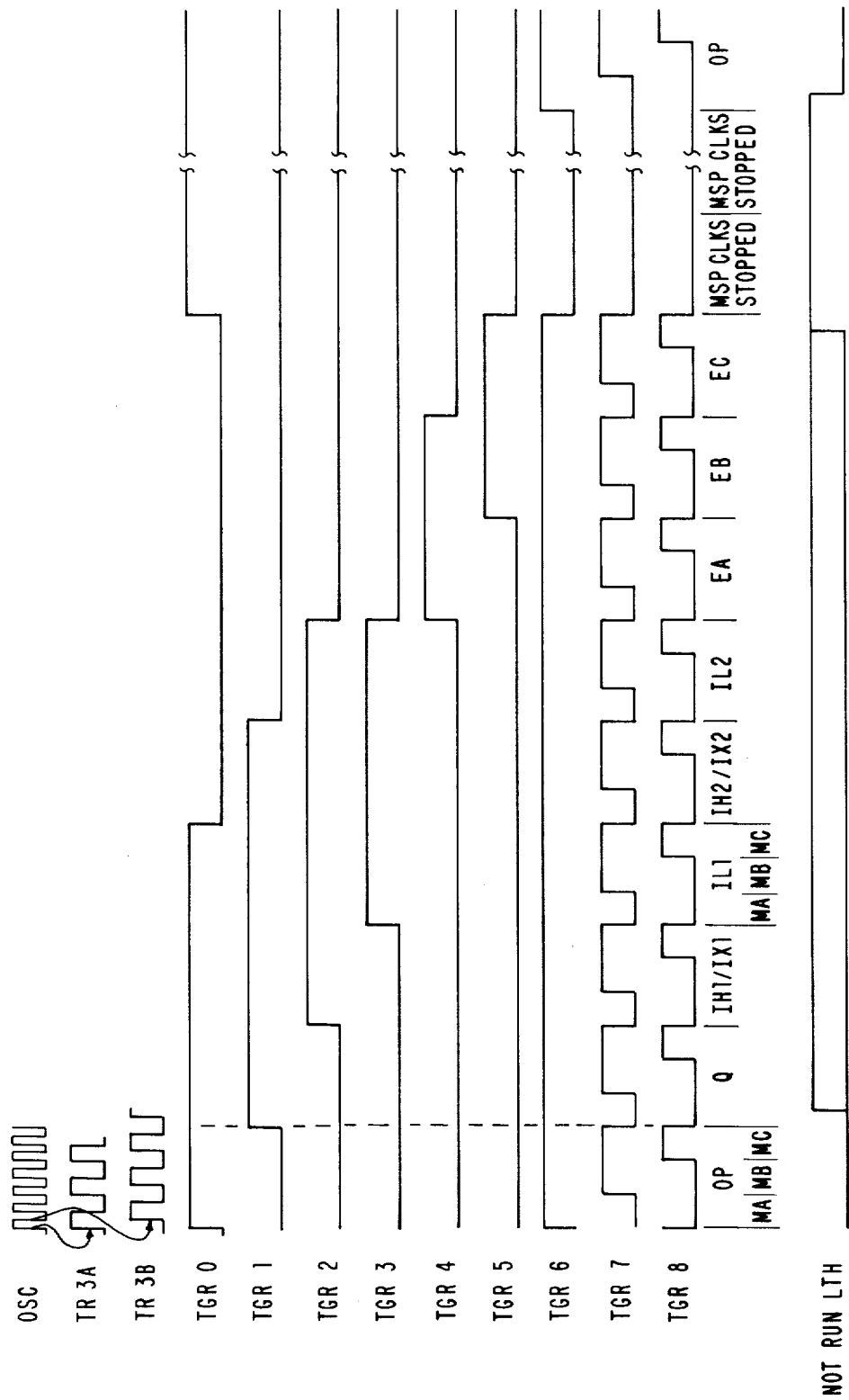
FIG. 13 is a timing diagram of the clock triggers and the I fetch and execution times in the main storage processor.
Figure 14B:
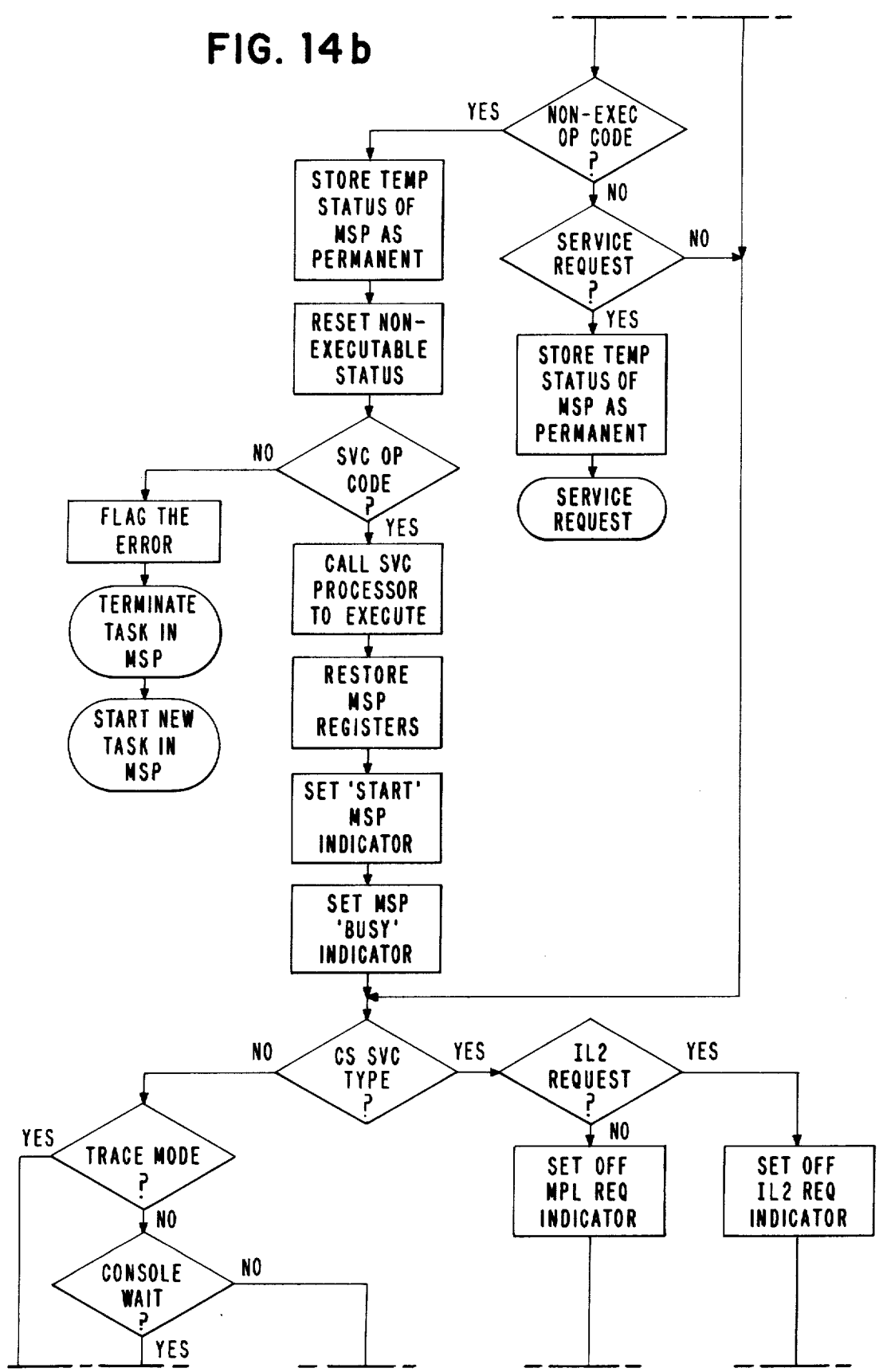
Figure 14C:
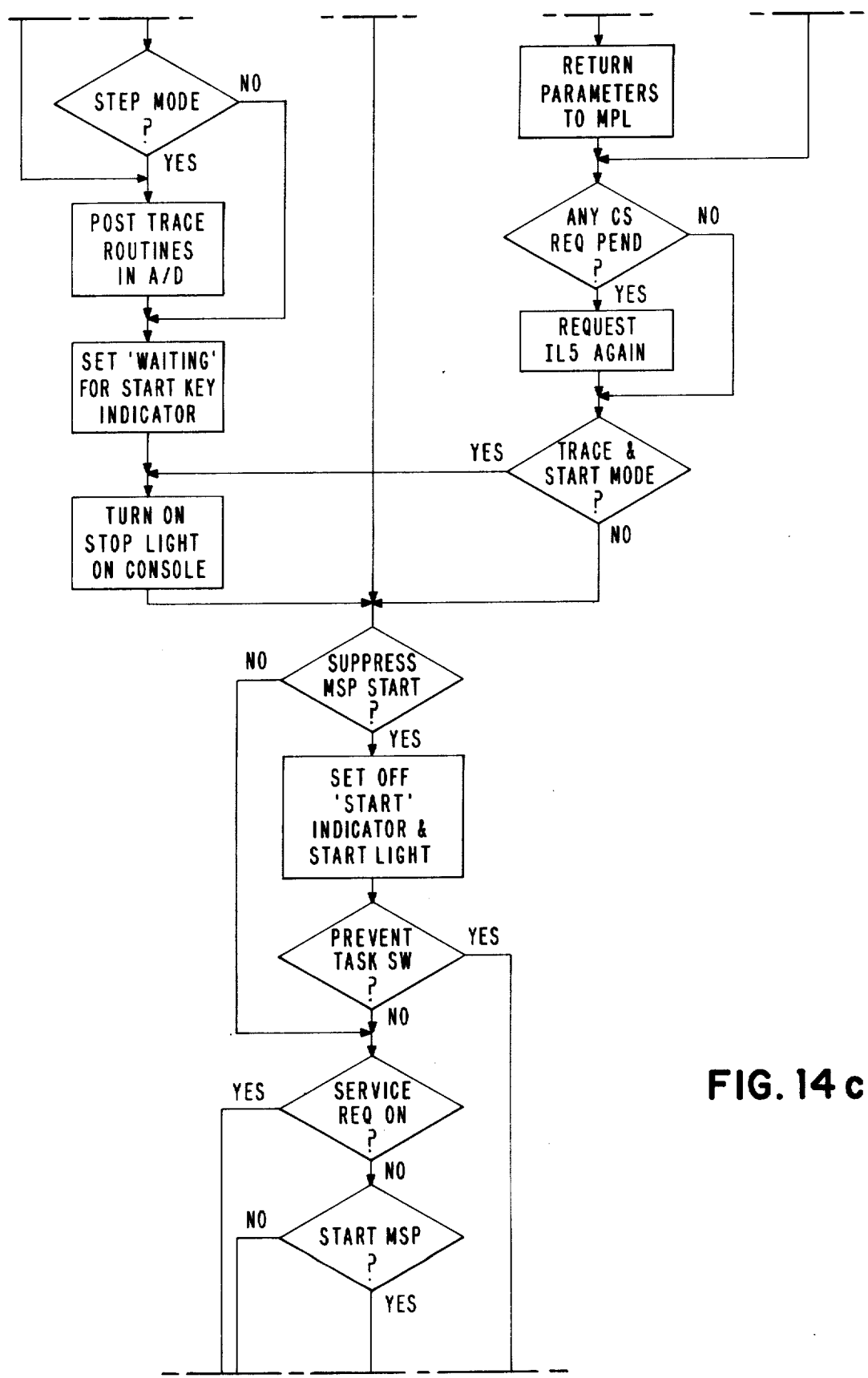
Figure 14D:
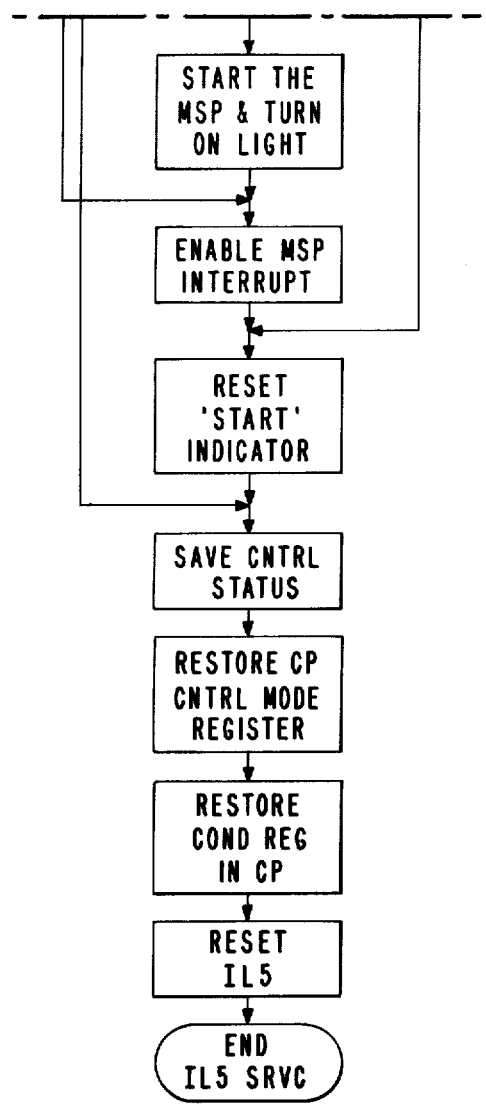

Clock decode 81 includes logic for generating minor times MA, MB, MC and MD. MA is the AND of trigger 76 and not trigger 78. MB is the AND of trigger 78 and not trigger 79. MC is the AND of trigger 78 and trigger 79. MD is the AND of not trigger 76 and trigger 78. The major cycles are EA, EB and EC times which are used during the execution phase of an instruction. EA time is the AND of trigger 72 and not trigger 74. EB time is the AND of trigger 72 and trigger 74. EC time is the AND of not trigger 72 and trigger 74. The output signals from triggers 71–79 inclusive and from decodes 80 and 81 are shown in FIG. 13.

Figure 4A:
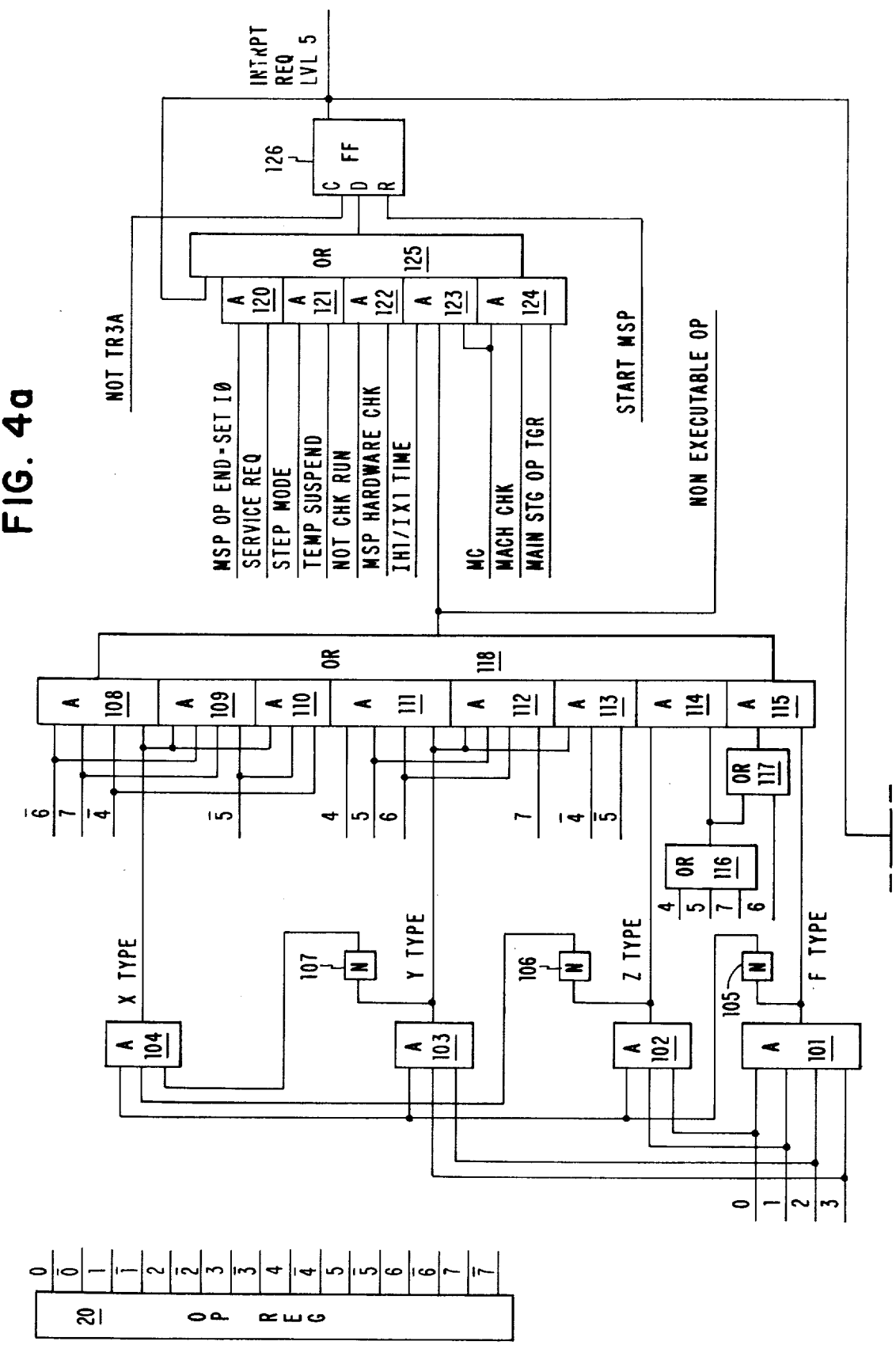
FIGS. 4a and 4b with FIG. 4a disposed above FIG. 4b taken together form a logic diagram illustrating the instruction and function decode logic in the MSP.
Figure 4B:
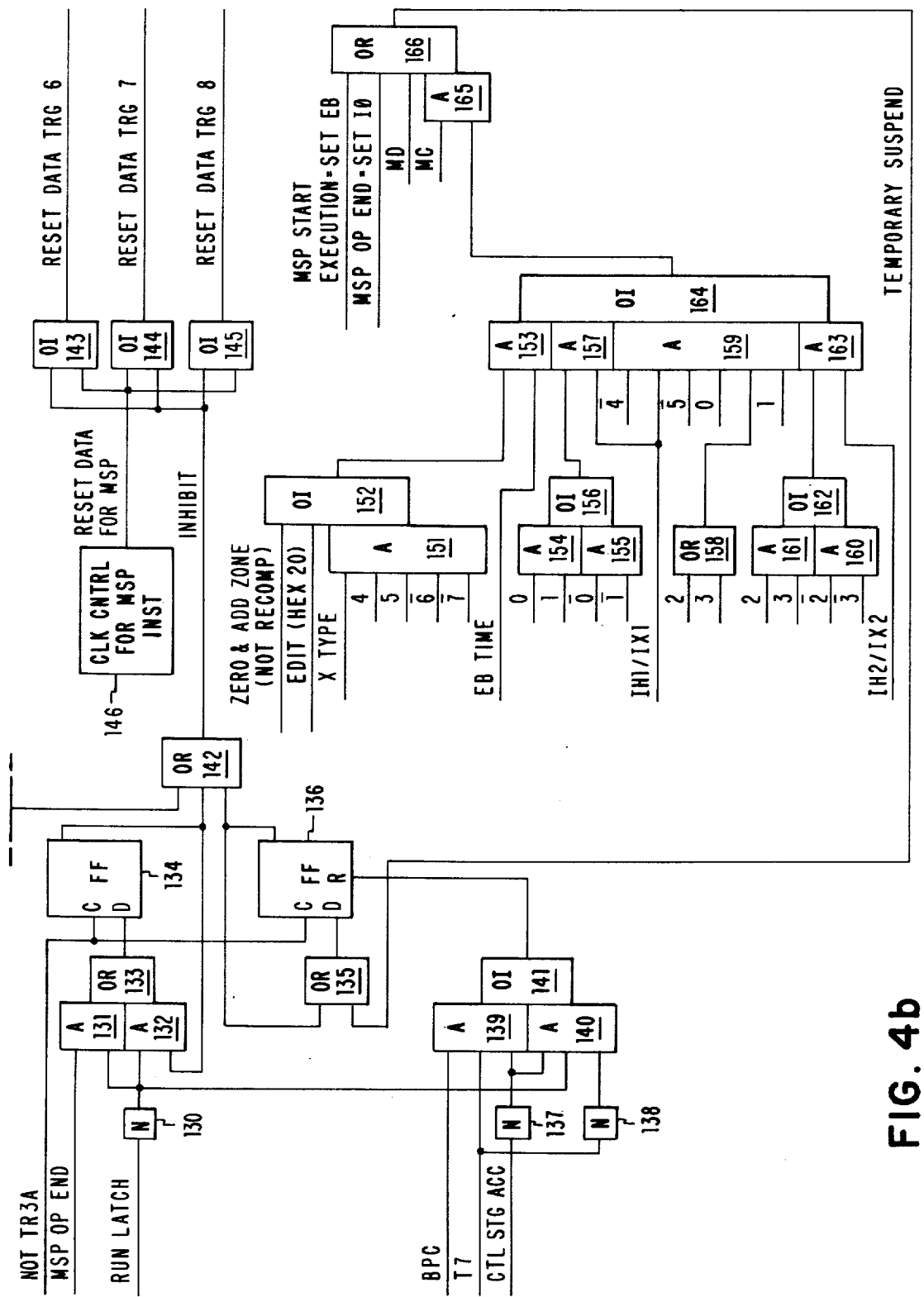
Figure 5B:
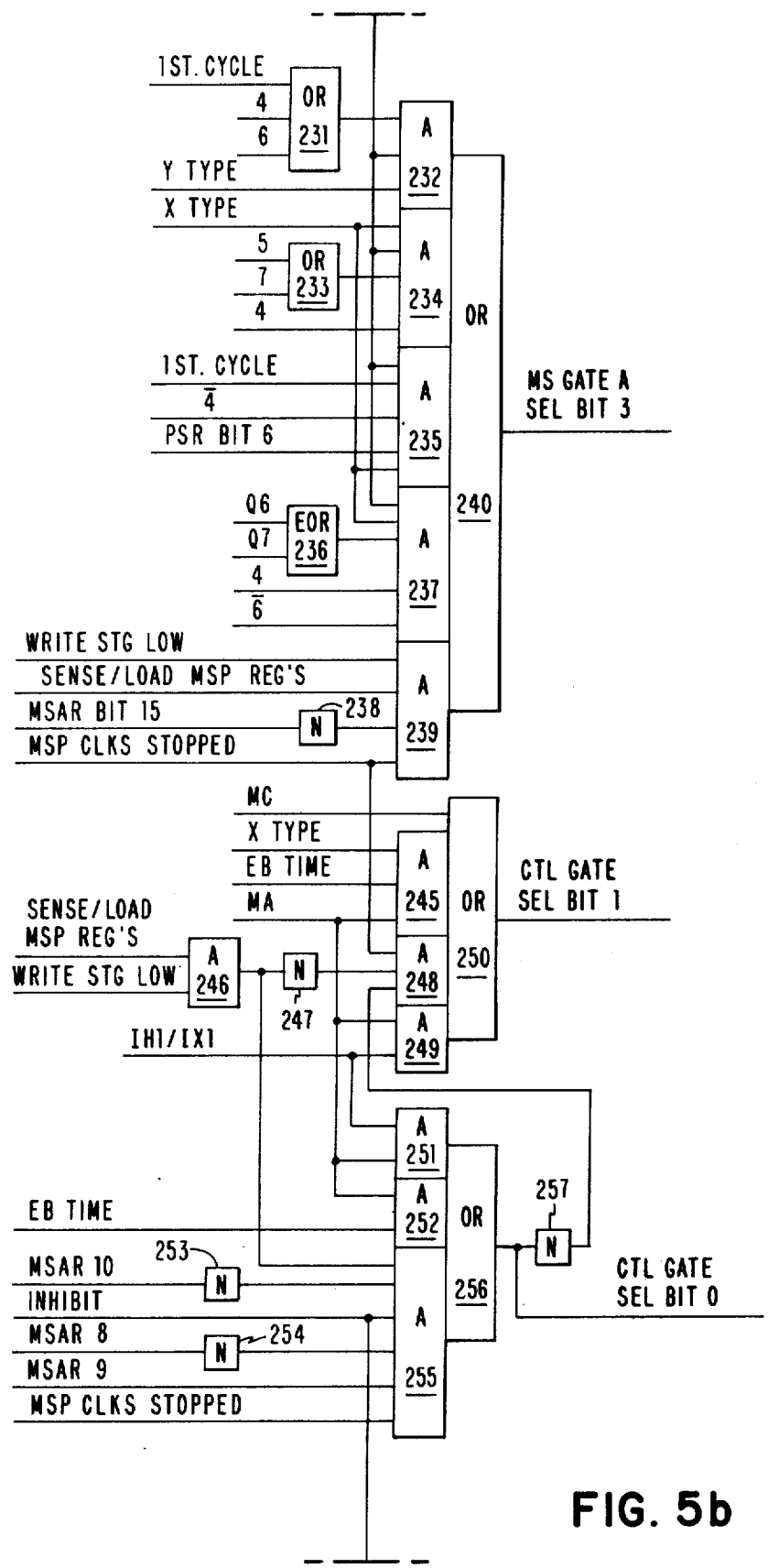
Figure 5C:
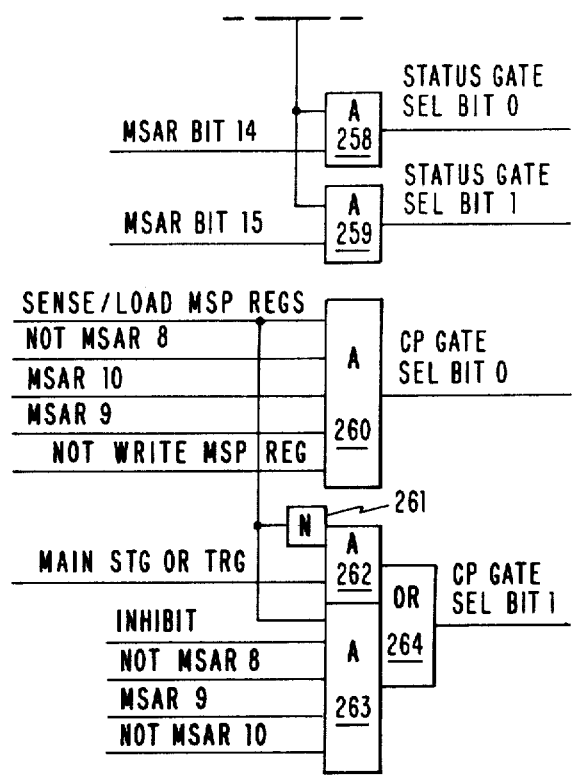
Figure 5C:
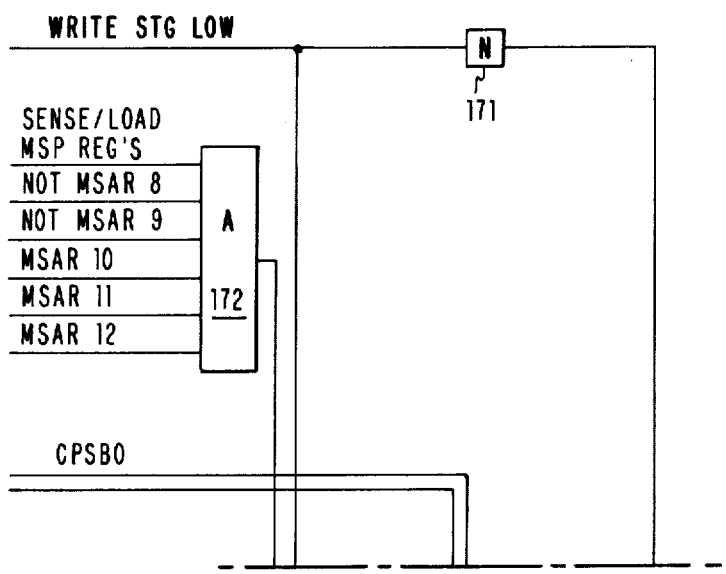
Figure 5D:
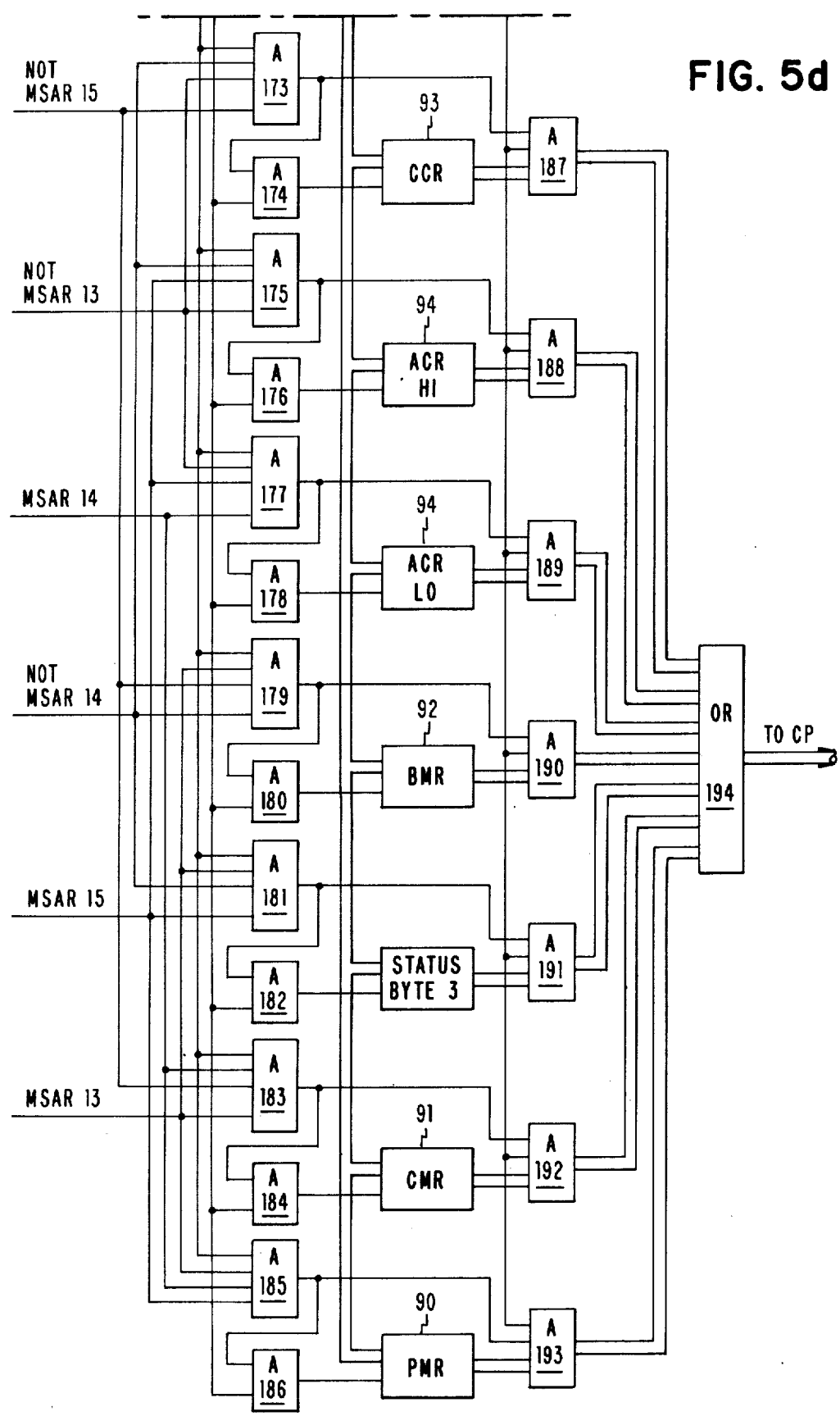

The details of the instruction function decode and control logic 100 pertinent to the present invention are shown in FIGS. 4a and 4b. There are three types of instructions: one address instructions, two address instructions, and command instructions. One address instructions address only one field within main storage. Two address instructions are those instructions that address two fields within main storage. Command instructions are those instructions that do not address main storage. AND circuits 101, 102, 103 and 104, FIG. 4a, together with inverters 105, 106, and 107 function to identify the instruction type. These AND circuits have inputs connected to OP register 20. The output of AND circuit 102 defines a Z type instruction, i.e., a command instruction and it feeds AND circuit 114 which also receives an input from OR circuit 116 which has inputs from OP register 20. The output of AND circuit 114 feeds OR circuit 118 to indicate a non-executable instruction.

AND circuit 103 defines a Y type of instruction, i.e., a one address instruction and its output feeds AND circuits 111, 112, and 113 which in turn feed OR circuit 118 to define non-executable instructions. The output of AND circuit 104 defines an X type instruction, i.e., a two address instruction and it feeds AND circuits 108, 109, and 110 which in turn feed OR circuit 118 to define further non-executable instructions. AND circuit 101 also defines non-executable instructions and its output feeds AND circuit 115 which also receives a signal from OR circuit 117 having inputs from OR circuit 116 and OP register 20. AND circuit 115 feeds OR circuit 118.

The output of OR circuit 118 feeds AND circuit 123 which also receives timing signals MC and IH1/IX1. AND circuit 123 feeds OR circuit 125 and its output is connected to the data input of trigger 126. Trigger 126 is clocked by the timing signal NOT TR3A from trigger 51 FIG. 3. The output of trigger 126 is an interrupt request level 5 signal which is transmitted to CP 300, to OR circuit 125 to hold trigger 126 set until it receives a Start MSP signal and to OR circuit 142 which feeds OR invert circuits 143, 144, and 145, FIG. 4b, whose outputs are connected to the inputs of triggers 76, 78, and 79 respectively for stopping the CPU clock portion of block 50, FIG. 2f.

With triggers 76, 78, and 79 reset, FIG. 3a, clock decode 81 provides inputs into OR invert circuit 82 whereby a MSP Clocks Stopped signal is provided. OR invert circuits 143, 144, 145, FIG. 4b, also receive inputs from clock control for main storage instruction block 146 which also enables the resetting of triggers 76, 78, and 79.

The other conditions which can control the data input of trigger 126 to invoke an interrupt request level 5 signal are represented by AND circuits 120, 121, 122, and 124. AND circuit 120 is connected to receive the MSP OP END signal and a Service Request signal from the CP 300. AND circuit 121 receives the Step Mode signal and the Temporary Suspend signal. AND circuit 122 receives the Not Check Run signal and the MSP Hardware Check signal. AND circuit 124 receives a Machine Check signal, the MC timing signal, and the Main Storage OP Trigger signal. Trigger 126 is reset under control of the Start MSP signal. Hence, when the MSP clocks are stopped by the interrupt request level 5 signal, they remain stopped until the CP 300 provides the START MSP signal.

The inhibit signal developed by OR circuit 142 for stopping the MSP clocks can also be generated from triggers 134 and 136. These triggers are clocked by the Not TR3A pulse. The data input of trigger 134 is connected to OR circuit 133 which has inputs from AND circuits 131 and 132. AND circuit 131 receives a MSP OP END signal and the output of inverter 130 which is feed by the CP Run Latch signal. The output of inverter 130 also feeds AND circuit 132. The other input into AND circuit 132 is from the set output of trigger 134. By this arrangement the MSP clocks automatically restart when the run latch turns on again.

The data input of trigger 136 is controlled by OR circuit 135 which receives the set output of trigger 136 and the Temporary Suspend signal. The reset input of trigger 136 is connected to OR invert circuit 141 which is fed by AND circuits 139 and 140. The inputs into AND circuit 139 are the Block Processor Clock signal, the T7 Timing signal and the output of inverter 137 which receives the Control Storage Access signal. Inverter 137 also feeds AND circuit 140 which also has inputs from inverters 130 and 138. Inverter 138 is fed by the T7 Timing signal. Hence, the MSP clocks are stopped when trigger 16 is set on and remain stopped until trigger 136 is reset by OR invert circuit 141.

The Temporary Suspend signal functions to stop the CPU clocks in the MSP when the CP or the I/O devices are cycle stealing a main storage cycle. The Temporary Suspend signal comes from OR circuit 166 which has inputs from AND circuit 165, a MD Timing signal from clock decode 81, a MSP OP END signal from instruction function decode and control logic 100 and a MSP Start Execution signal. AND circuit 165 receives a MC Timing signal from clock decode 81 and a signal from OR invert circuit 164. OR invert circuit 164 is fed by AND circuits 153, 157, 159 and 163. AND circuit 153 is fed by an EB Timing signal from clock decode 81 and a signal from the output of OR invert circuit 152. OR invert circuit 152 receives an Edit (Hex 20) signal a Zero and Add Zero (Not Recomp) signal from instruction function decode and control logic 100 and a signal from AND circuit 151. AND circuit 151 receives a X type signal from AND circuit 104 and bit inputs from OP register 20.

AND circuit 157 receives the IH1/IX1 Timing signal from clock decode 80 and a signal from OR invert circuit 156. OR invert circuit 156 is fed by AND circuits 154 and 155 which receive inputs from OP register 20. The IH1/IX1 Timing signal from clock decode 80 also feeds AND circuit 159 which has inputs from OP register 20 and an input from OR circuit 158. OR circuit 158 receives inputs from OP register 20. AND circuit 163 is fed by the IH2/IX2 timing signal from clock decode 80 and a signal from OR invert circuit 162. OR invert circuit 162 is fed by AND circuits 160 and 161 which receive inputs from OP register 20.

It is seen from the foregoing that controls have been provided for detecting non-executable instructions and in response to such detection generate an Interrupt Request Level 5 signal which is sent to the CP 300 and also used for stopping the CPU clocks in the MSP. In addition to detecting a non-executable instruction, the Interrupt Request Level 5 signal is generated when the CP 300 provides a Service Request signal and the MSP 10 provides a MSP OP END signal. The Interrupt Request Level 5 signal is also provided during step mode together with a Temporary Suspend signal. A MSP Hardware Check signal will also cause the Interrupt Request Level 5 signal to be generated as does the Machine Check signal together with Main Storage Op Trigger signals. The MSP clocks remain stopped until the CP 300 sends the Start MSP signal. It is also seen that if the run latch is turned off or if operation of the MSP is temporarily suspended the MSP clocks are turned off, but automatically turn back on when the run latch turns on or when the temporary condition no longer exists.

Main storage accesses by the MSP, CP or I/O devices require specific control over the main storage gates 47 and 49, FIG. 2a which physically can be a single gate. The main storage gate 47 and 49 are controlled by gate control logic 200. The main storage gate control logic 200 includes logic for generating main storage gate select bits 0, 1, 2, and 3, FIG. 5. The encode of the main storage gate select bits is set forth in the table below.

| MAIN STORAGE GATE SELECT BITS | | | | |
|---|---|---|---|---|
| Bits | | | | |
| 0 | 1 | 2 | 3 | Selection |
| 0 | 0 | 0 | 0 | CPSBO |
| 0 | 0 | 0 | 1 | Y |
| 0 | 0 | 1 | 0 | LSRH |
| 0 | 0 | 1 | 1 | LSRL |
| 0 | 1 | 0 | 0 | Zone='F', Num=AU |
| 0 | 1 | 0 | 1 | Zone='D', Num=AU |
| 0 | 1 | 1 | 0 | Not Used |

-continued

| MAIN STORAGE GATE SELECT BITS | | | | |
|---|---|---|---|---|
| Bits | | | | |
| 0 | 1 | 2 | 3 | Selection |
| 0 | 1 | 1 | 1 | ALU |
| 1 | 0 | 0 | 0 | Zone='F', Num=YN |
| 1 | 0 | 0 | 1 | Zone='D', Num=YN |
| 1 | 0 | 1 | 0 | Not Used |
| 1 | 0 | 1 | 1 | ,Not Used |
| 1 | 1 | 0 | 0 | Zone=YZ, Num=XN |
| 1 | 1 | 0 | 1 | Zone=YN, Num=XN |
| 1 | 1 | 1 | 0 | Zone=XZ, Num=YN |
| 1 | 1 | 1 | 1 | Zone=XZ, Num=YZ |

The main storage gate select bits 0, 1, 2, and 3 are in the 0 state when CP 300 is accessing main storage. When this condition exists main storage gate 49 passes the contents of CPSBO via OR circuit 48 to main storage 15. It will be recalled that when the CP 300 is accessing main storage 15, the MSP clocks are stopped. Hence, in FIG. 5 a MSP Clocks Stopped signal is applied to inverter 201 and the output of inverter 201 feeds AND circuits 207, 209, 210, 211, 213, 220, 221, 222, 225, 232, 234, 235, and 237. The main storage gate select bit 0 is taken from AND circuit 207. Hence this bit will be 0 when the MSP clocks are stopped. AND circuits 209, 210, 211, and 213 feed OR circuit 214 and the main storage gate select bit 1 is taken from OR circuit 214. Hence, the main storage gate select bit 1 will be 0 when the MSP clocks are stopped. The main storage gate select bit 2 is taken from OR circuit 228 which is fed by AND circuits 220, 221, 222, 225 and 227. Although AND circuit 227 does not have an input from inverter 201 as does AND circuits 220, 221, 222 and 225, it is not conditioned during a main storage access.

Hence, main storage gate select bit 2 will be 0 when the MSP clocks are stopped and the CP is requesting a main storage access. The main storage gate select bit 3 is taken from OR circuit 240. OR circuit 240 is fed by AND circuits 232, 234, 235, 237 and 239. All of these AND circuits except AND circuit 239 are inhibited by the signal from inverter 201. AND circuit 239, however, is not conditioned during a main storage access. Hence, during a main storage access when the MSP clocks are stopped, the main storage gate select bit 3 will be zero.

AND circuit 207 which generates the main storage gate select bit 0 is fed by OR circuit 206. OR circuit 206 has inputs from AND circuits 202, 203, 205 and also receives the OP Time timing signal, and F Type and Z Type Instruction signals. The Z Type Instruction signal comes from AND circuit 102 FIG. 4 and the F Type Instruction signal comes from inverter 105, FIG. 4. The OP Time signal comes from clock decode 80, FIG. 3. AND circuits 202, 203, and 205 receive the X Type instruction signal from AND circuit 104, FIG. 4 and bit inputs from the OP register 20. Additionally, AND circuit 203 receives a Not Recomplement signal from inverter 204.

The Recomplement signal also feeds OR circuit 208 which feeds AND circuit 209. The X Type signal is also fed into AND circuits 209, 210, and 211. AND circuit 213 receives the Y Type instruction signal from AND circuit 103, FIG. 3 and an input from OR circuit 212. The other inputs into AND circuits 209, 210, 211, and 213 and OR circuits 208 and 212 are bit inputs from OP register 20.

AND circuits 220, 221, and 222 each receive the X Type instruction signal and bit inputs from OP register 20. AND circuit 222 additionally receives a bit input from Q register 28. AND circuit 225 receives the Y Type instruction signal and an input from OR circuit 224. OR circuit 224 receives an input from inverter 223, a 1st Cycle timing signal and bit inputs from OP register 20. Inverter 223 receives a bit input from Q register 28. AND circuit 227 receives the MSP Clocks Stopped signal, the Sense/Load MSP Register signal from the CP 300 and an input from inverter 226. Inverter 226 receives a Write Storage signal. AND circuit 227 thus functions to generate a main storage gate select bit 2 signal during a sense/load MSP register operation.

AND circuit 239 is similar to AND circuit 227 in the sense that it functions to generate the main storage gate select bit 3 during a sense/load MSP register operation. AND circuit 239 receives the Sense/Load MSP Register signal, the Write Storage signal, the MSP Clocks Stopped signal, and a signal from inverter 238 which receives bit 15 from the MSAR register. And circuit 232 receives an input from OR circuit 231 and a Y Type Instruction signal. OR circuit 231 receives the 1st Cycle signal and bit inputs from OP register 20. AND circuits 234, 235, and 237 each receive the X Type Instruction signal. AND circuit 234 additionally receives an input from OR circuit 233 and a bit input from OP register 20. OR circuit 233 receives bit inputs from OP register 20. AND circuit 235 receives the 1st Cycle signal and bit inputs from the OP register 20 and from the processor status register (PSR). AND circuit 237 receives bit inputs from OP register 20 and an input from exclusive OR circuit 236. Exclusive OR circuit 236 is connected to receive bit inputs from Q register 28.

Gate control logic 200 includes logic for controlling control gate 25. Control gate selection bits 0 and 1 are taken from OR circuits 256 and 250, respectively. The encode of the control gate selection bits is shown in the table below.

| CONTROL GATE SELECTION BITS | | |
|---|---|---|
| Bits | | |
| 0 | 1 | Selection |
| 0 | 0 | No Selection |
| 0 | 1 | STG Bus |
| 1 | 0 | Status Gate |
| 1 | 1 | Q Backup Reg |

OR circuit 250 is fed by the MC Timing signal and by AND circuits 245, 248, and 249. AND circuit 245 receives the X Type Instruction signal, and the EB and MA timing signals. AND circuit 248 receives the MSP Clocks Stopped signal and the outputs of inverters 247 and 257. Inverter 247 is fed by AND circuit 246 which receives the Sense/Load MSP Register signal and the Write Storage signal. AND circuit 257 is fed by OR circuit 256. AND circuit 249 receives the IH1/IX1 and MA timing signals.

OR circuit 256 is fed by AND circuits 251, 252 and 255. AND circuit 251 receives the IH1/IX1 and MA timing signals. AND circuit 252 receives the EB and MA timing signals. AND circuit 255 receives the MSP Clocks Stopped signal, inputs from inverters 253 and 54, an input from AND circuit 246, a bit input from the MSAR register, and the Inhibit signal from OR circuit 142, FIG. 4. Inverters 253 and 254 are fed by bit inputs from the MSAR register.

The status gate is controlled by two select bits 0 and 1 which are taken from AND circuits 258 and 259. AND circuits 258 and 259 receive the Inhibit signal from OR circuit 142, FIG. 4 and bit inputs from the MSAR register. The encode of the status gate select bits 0 and 1 are set forth in the table below.

| STATUS GATE SELECT BITS | | |
|---|---|---|
| Bits | | |
| 0 | 1 | Selection |
| 0 | 0 | PSR Reg |
| 0 | 1 | Status Byte 0 |
| 1 | 0 | Status Byte 2 |
| 1 | 1 | Q Reg |

As seen in the table, when the status gate select bits 0 and 1 are both 0, the processor status register (PSR) is selected. Status byte 0 is selected when the select bits 0 and 1 are 0 and 1 respectively and status byte 2 is selected if the bits 0 and 1 are 1 and 0 respectively. If both of the status gate select bits 0 and 1 are 1 the Q register 28 is selected. It will be recalled that the status gate feeds the control gate 25.

The control processor gate 30 is selected by control processor gate select bits 0 and 1 which appear at the output of AND circuit 260 and OR circuit 264 respectively. AND circuit 260 receives the Sense/Load Register signal from the control processor 300, the Not Write MSP Register signal, and bit inputs from MSAR register. OR circuit 264 is fed by AND circuits 262 and 263. AND circuit 262 receives an input from inverter 261 which receives the Sense/Load Register signal. AND circuit 262 also receives the Main Storage OP Trigger signal from the control processor. AND circuit 263 receives the Inhibit signal from OR circuit 142, FIG. 4, the Sense/Load Register signal and bit inputs from the MSAR register. The encode of the control processor gate select bits 0 and 1 are set forth in the table below.

| CONTROL PROCESSOR GATE SELECT BITS | | |
|---|---|---|
| Bits | | |
| 0 | 1 | Selection |
| 0 | 0 | MS GT |
| 0 | 1 | MSP CTR GT |
| 1 | 0 | Degate |

The control processor gate select bits 0 and 1 will either select the main storage gate 47, the control gate 25, or degate both gates 25 and 47. The degating takes place when both the MSP 10 and CP are running. The sense byte gate 39 which is fed by the ATR 12, ACR 94, CCR 93, BMR 92, CMR 91, PMR 90 and Status Byte 3 registers includes AND circuits 187-193 inclusive. These AND circuits are representative of a plurality of AND circuits, one for each bit position in the associated register. Further, each of these AND circuits feeds OR circuit 194 and is gated by the output of inverter 171 which receives the Write Storage signal.

The AND circuits 187-193 are also controlled by outputs of AND circuits 173, 175, 177, 179, 181, 183 and 185 respectively. Each of the latter mentioned AND circuits is fed by AND circuit 172. AND circuit 172 receives bit inputs from the MSAR register and the Sense/Load MSP Registers signal. In addition to the input from AND circuit 172, the AND circuits 173, 175, 177, 179, 181, 183, and 185 receive bit inputs from the MSAR register. The AND circuits 173, 175, 177, 179, 181, 183, and 185 also feed AND circuits 174, 176, 178, 180, 182, 184, and 186 respectively and these latter AND circuits also receive the Write Storage signal.

AND circuits 174, 176, 178, 180, 182, 184, and 186 control the clocking of the CCR, ACRH, ACRL, BMR, Status Byte 3, CMR and PMR registers, respectively.

Figure 6A:
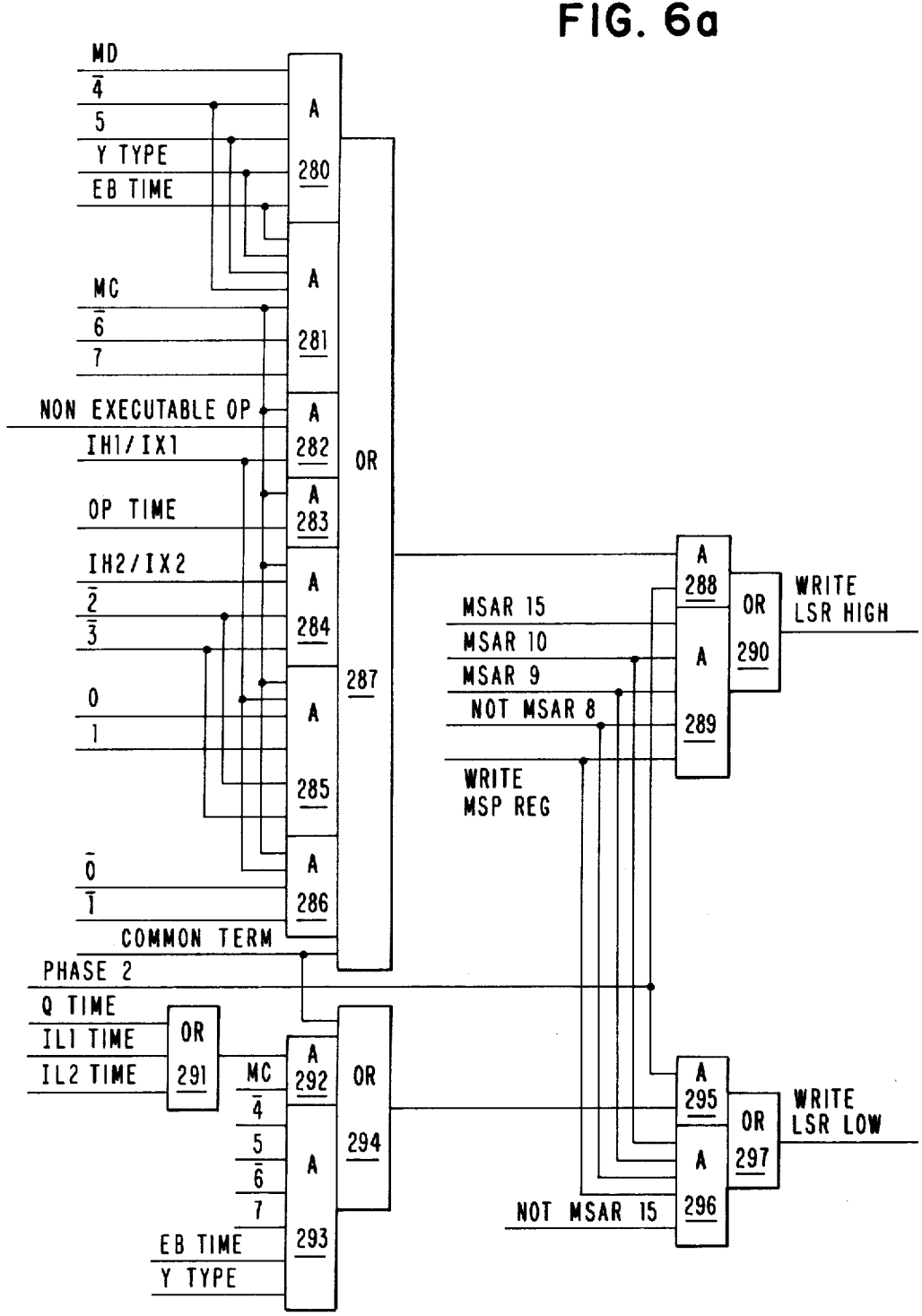
FIGS. 6a and 6b taken together are a logic diagram illustrating the local storage register (LSR) control logic in the MSP.
Figure 6B:
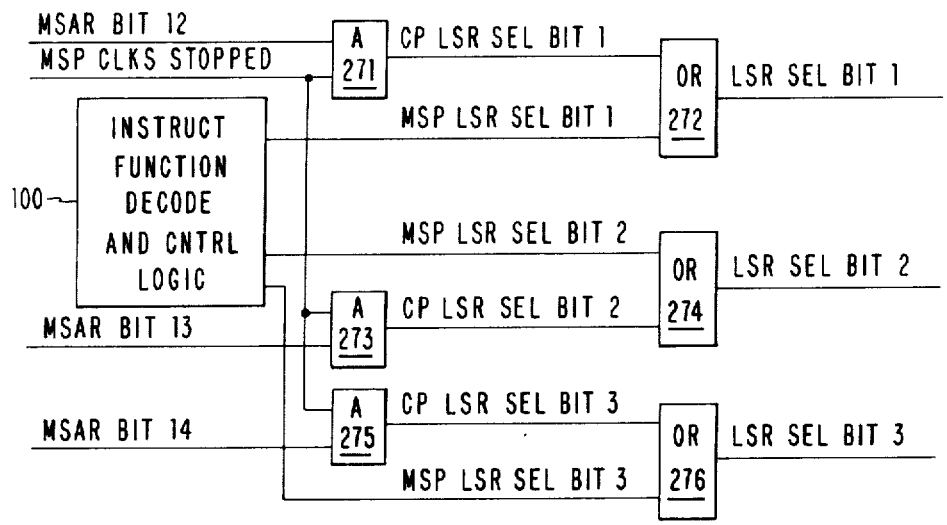
Figure 11:
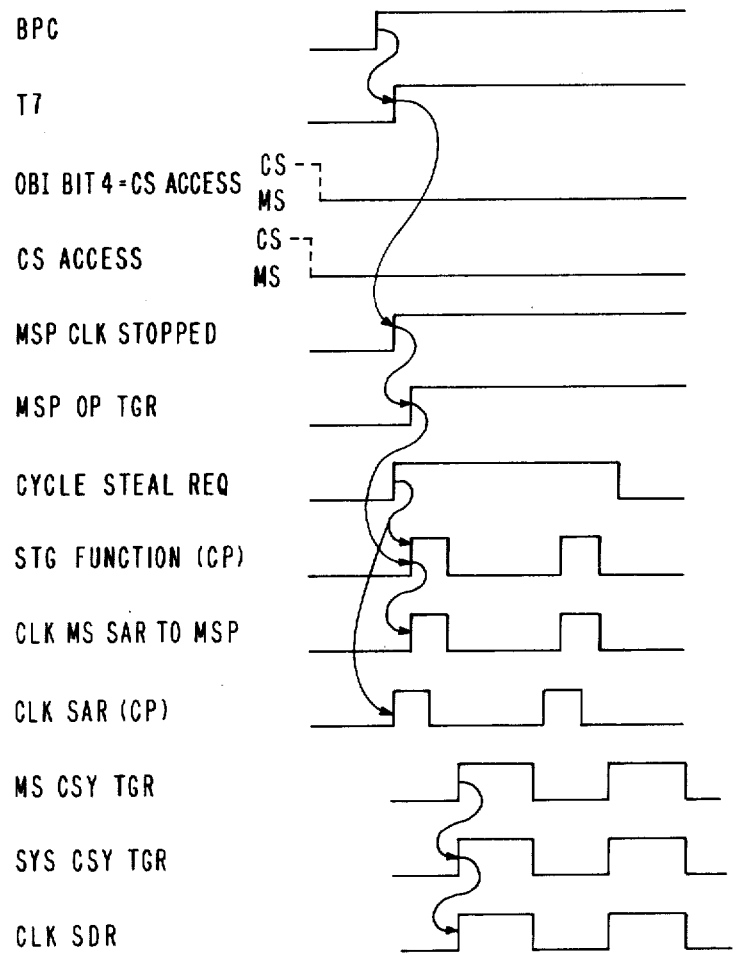
FIG. 11 is a timing diagram illustrating timings during a main storage cycle steal operation.

In this particular example, there are 8 LSR registers 36 and each register consists of a high byte and a low byte. The registers are selected or addressed by means of LSR select bits 1, 2, and 3 from block 270, FIG. 2a. LSR select bits 1, 2, and 3 are taken from OR circuits 272, 274, and 276 respectively, FIG. 6. The LSRs 36 are either selected under control of the MSP 10 or the CP 300. When the LSRs 36 are selected under control of the CP, the MSP clocks are stopped. Thus the MSP Clocks Stopped signal is applied to AND circuits 271, 273 and 275 which feed OR circuits 272, 274 and 276 respectively. The other inputs into AND circuits 271, 273 and 275 are bit inputs from the MSAR register. The MSP LSR select bits 1, 2, and 3 are taken from the instruction function decode and control logic 100. When the MSP clocks are stopped the MSP LSR select bits 1, 2, and 3 are zero. The encode of the LSR Select bits is set forth in the table below.

| | LSR SELECT BITS | | |
|---|---|---|---|
| 1 | 2 | 3 | Selection |
| 0 | 0 | 0 | OPERAND 1 |
| 0 | 0 | 1 | OPERAND 2 |
| 0 | 1 | 0 | IAR |
| 0 | 1 | 1 | OP/Q |
| 1 | 0 | 0 | XR1 |
| 1 | 0 | 1 | XR2 |
| 1 | 1 | 0 | ARR |
| 1 | 1 | 1 | LCRR |

The LSR select logic 270 also includes logic for generating the Write signals for writing data into the LSRs 36. Data is read from the LSRs, 36 upon being addressed, in the absence of Write LSR signals. Write LSR High and Write LSR Low signals are taken from OR circuits 290 and 297, respectively. OR circuit 290 is fed by AND circuits 288 and 289 and OR circuit 297 is fed by AND circuits 295 and 296. AND circuit 288 receives a Phase 2 timing signal and a signal from OR circuit 287. AND circuit 289 receives a Write MSP Register signal from instruction function decode and control logic 100 and bit inputs from MSAR register. OR circuit 287 is fed by AND circuits 280-286 inclusive. AND circuit 280 receives the Y Type instruction signal, the MD and EB timing signals and bit inputs from the OP register 20. AND circuit 281 receives the EB and MC timing signals, the Y Type Instruction signal and bit inputs from OP register 20. AND circuit 282 receives the Non-Executable OP signal from OR circuit 118, FIG. 4 and the MC and IH1/IX1 timing signals. AND circuit 283 receives the MC and OP Time timing signals. AND circuit 284 receives the MC and IH2/IX2 timing signals and bit inputs from the OP register 20. AND circuit 285 receives the MC and IH1/IX1 timing signals and bit inputs from OP register 20. AND circuit 286 has similar inputs to AND circuit 285 except for the specific bit inputs from the OP register 20. It is thus seen that AND circuits 280 and 281 control writing into the LSRs 36 during a Y Type Instruction. AND circuit 282 controls the writing into the LSRs during Non-Executable Instructions. AND circuit 283 controls the writing during OP Time and AND circuit 284 controls the writing during IH2/IX2 Time. AND circuits 285 and 286 control the writing during IH1/IX1 for executable instructions.

OR circuit 287 additionally receives a Common Term signal. This Common Term signal is also applied to OR circuit 294 which feeds AND circuit 295. The Common Term signal is a representative signal resulting from MSP operations requiring data to be written into the LSR's. AND circuit 295 also receives a Phase 2 signal. OR circuit 294 also receives inputs from AND circuits 292 and 293. AND circuit 292 receives the MC Timing signal and a signal from OR circuit 291 which receives the Q Time, IL1 Time and the IL2 Time signals. AND circuit 293 which receives a Y Type Instruction signal, an EB timing signal, and bit inputs from the OP register 20. The low LSR registers are also written into under control of AND circuit 296 which feeds OR circuit 297. AND circuit 296 receives bit inputs from the MSAR register and a Write MSP Register signal.

Figure 7A:
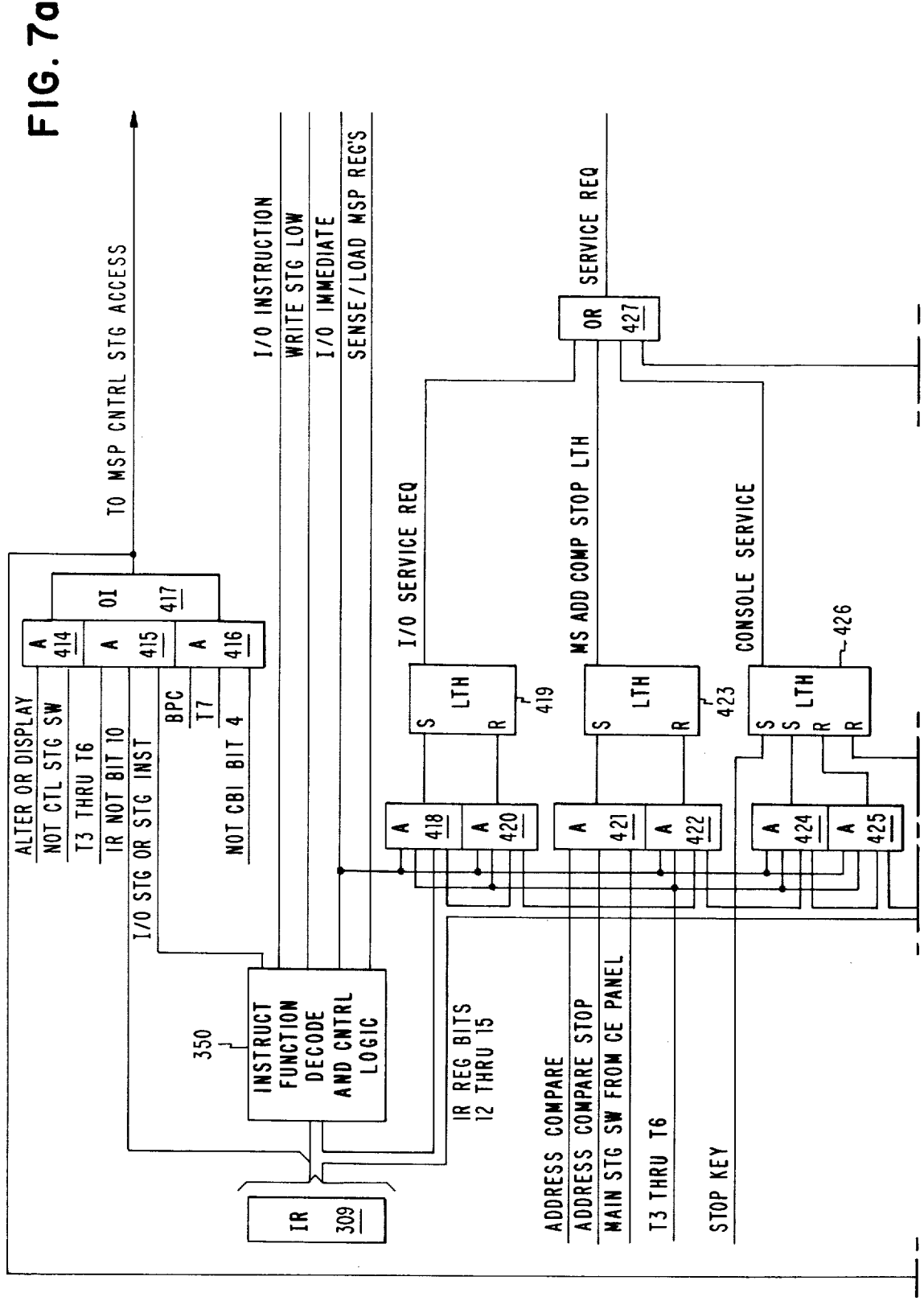
FIGS. 7a and 7b with FIG. 7a disposed above FIG. 7b taken together form a logic diagram illustrating CP control logic for the MSP.
Figure 7B:
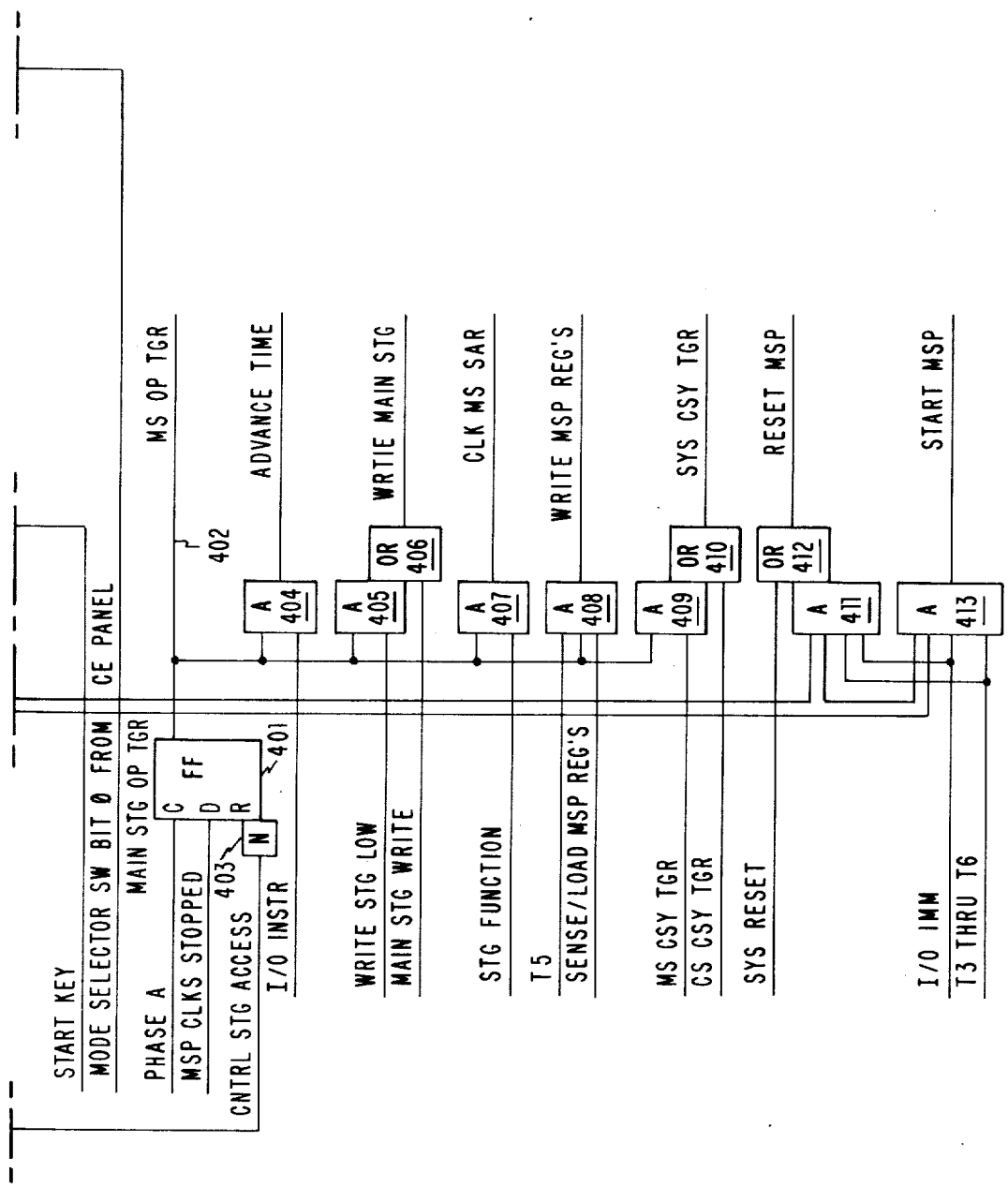

The CP control logic for the MSP is contained in block 400, FIG. 2b. The CP control logic for MSP 400 is shown in detail in FIGS. 7a and 7b. The main storage OP trigger 401, FIG. 7b, generates the main storage OP trigger signal on line 402. The main storage OP trigger 401 is clocked by a Phase A clock signal from CPU clocks and storage clocks 330, FIG. 2d. The data input of main storage OP trigger 401 is connected to receive the MSP Clocks Stopped signal. The reset input of the main storage OP trigger 401 is connected to inverter 403 which receives a Control Storage Access Signal from OR invert circuit 417.

OR invert circuit 417 is fed by AND circuits 414, 415 and 416. AND circuit 414 receives an Alter or Display signal and a Not Control Storage Switch signal. AND circuit 415 receives a T3 through T6 timing signal from the CPU and storage clocks 330, a Not Bit 10 signal from instruction register 309, and an I/O Storage or Storage Instruction signal from instruction decode 350. AND circuit 416 receives the Block Processor Clock signal, BPC, a T7 Timing signal from CPU clocks and storage clocks 330, and a Not CBI Bit 4 from the channel 500. The control storage access signal from OR invert circuit 417 is sent to the MSP.

The Main Storage OP Trigger signal besides being sent to the MSP is applied to AND circuits 404, 405, and 407-409 inclusive. An Advance Time signal is taken from AND circuit 404 which receives an I/O instruction signal from instruction function decode and control logic 350. The Write Main Storage signal is taken from OR circuit 406 which is fed by AND circuit 305 and by a Main Storage Write signal from the MSP. AND circuit 405 receives a Write Storage Low signal from instruction function decode and control logic 350. AND circuit 407 generates the clock MS SAR signal from the Storage Function signal which comes from instruction function decode and control logic 350. The Write MSP Registers signal comes from AND circuit 408 which receives a T5 Timing signal from CPU clocks and storage clocks 330 and a Sense/Load MSP Registers signal from instruction and function decode logic 350. The System CSY Trigger signal is passed by OR circuit 410 which receives an input from AND circuit 409 and the CSY Trigger signal from CPU clocks and storage clocks 330. AND circuit 409 receives the MS CSY Trigger signal from AND circuit 62 in the MSP, FIG. 3.

The Reset MSP signal comes from OR circuit 412 which receives a System Reset signal and a signal from AND circuit 411. AND circuit 411 receives an I/O Immediate signal from instruction and function decode logic 350, a T3 through T6 Timing signal from CPU clocks and storage clocks 330 and bit inputs 12 through 15 from the IR register 309. AND circuit 413 passes a Start MSP signal and has the sme inputs as AND circuit 411 but of course whether a Reset MSP signal is passed by AND circuit 411 or a Start MSP signal is passed by AND circuit 413 is dependent upon the state of the bits 12-15 in the IR register 309.

The Service Request signal comes from OR circuit 427 which is fed by latches 419, 423, and 426. Latch 419 is set under control of AND circuit 418 and reset under control of AND circuit 420. AND circuit 418 receives IR bits 12 through 15 from register 309, an I/O Immediate signal from instruction and function decode logic 350 and a T3 through T6 Timing signal. AND cicuit 420 has identical inputs to those of AND circuit 418 and therefore whether latch 419 is set or reset is dependent upon the states of IR bits 12 through 15. Latch 419 when set provides an I/O Service REQ signal to OR circuit 427. The I/O Service REQ signal is generated by a particular I/O Immediate microinstruction executed in the CP to stop the MSP. The I/O Service REQ signal effects a Service Request signal via OR circuit 427 for the purpose of pre-empting the current program executing in the MSP. The current program executing in the MSP is stopped at the completion of the current system language instruction. This enables program switching in the MSP through the CP.

Latch 423 is set and reset under control of AND circuits 421 and 422, respectively. AND circuit 421 receives the Address Compare signal, the Address Compare Stop signal and the Main Storage Switch signal. AND circuit 422 has the same inputs as AND circuits 418 and 420.

Latch 426 has two set and two reset inputs. One of the set inputs is connected to receive a Stop Key signal and the other set input is connected to AND circuit 424. AND circuit 424 has the same input signals as AND circuit 418, 420 and 422. One of the reset inputs is connected to receive a Start Key signal and the other reset input is connected to AND circuit 425 which has the same inputs as AND circuit 424. In addition to the inputs from latches 419, 423, and 426 OR circuit 427 receives a Mode Selector Switch Bit 0 signal. It is seen that Service Request is a signal generated by the CP when there is an I/O Immediate instruction being executed, when the MS Address Compare Stop latch is set or when console switches are set to request console service.

Figure 8A:
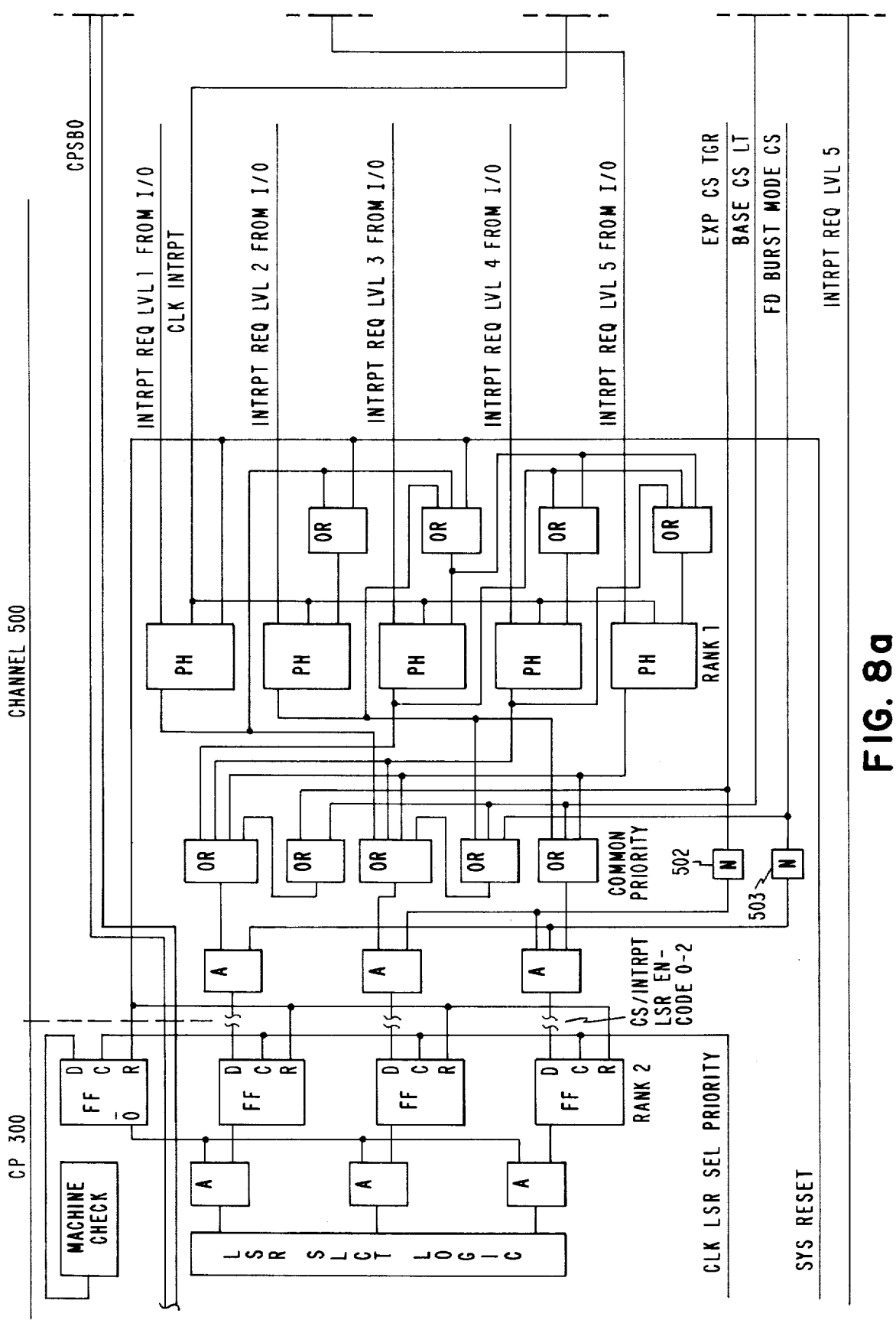
FIGS. 8a and 8b with FIG. 8a disposed to the left of FIG. 8b taken together form a logic diagram illustrating logic in the instruction and function decode logic in the CP.
Figure 8B:
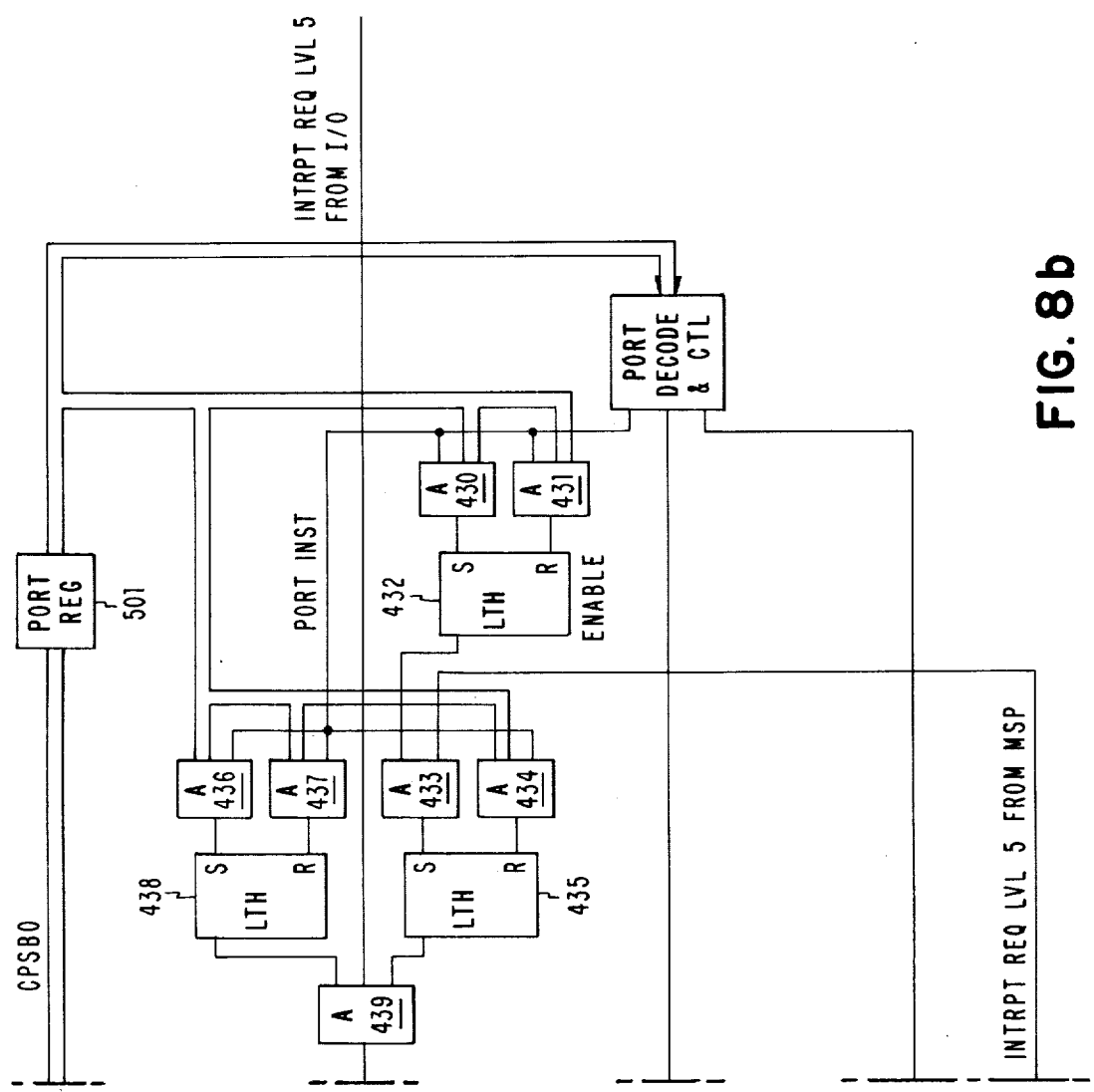

The Interrupt Request Level 5 signal from the MSP is sent to Interrupt Request Level 5 enabling logic shown in FIG. 8 as being in the channel. The Interrupt Request Level 5 enabling logic could be located in the MSP or in the CP. However, since the interrupt priority logic is located in the channel, and in this particular example a port register 501 can be used for the enabling function, the Interrupt Request Level 5 enabling logic is shown as being in the channel. The Interrupt Request Level 5 signal from the MSP is applied to AND circuit 433 in FIG. 8. This AND circuit is gated under control of enable latch 432. Latch 432 is set and reset under control of AND circuits 430 and 431 respectively. AND circuits 430 and 431 are connected to receive bits from port register 501 and a Port Instruction signal.

AND circuit 433 controls the setting of Interrupt Request Level 5 storage latch 435. Hence, latch 435 stores the Interrupt Request Level 5 signal from the MSP. Once the Interrupt Request Level 5 is stored in Latch 435, enable latch 432 can be reset. Thus, the sequence of events would be to load the port register 501 with control bits from an I/O Immediate instruction whereby enable latch 432 would be set. The Interrupt Request Level 5 signal would be then passed by AND circuit 433 for setting latch 435. Thereafter port register 501 would be loaded with control bits for satisfying AND circuit 431 whereby enable latch 432 would be reset. With enable latch 432 reset the MSP can be started so as to continue the processing of MSP instructions while the CP is servicing the interrupt that came from the MSP. The interrupt stored by latch 435 is passed to the interrupt priority logic via OR circuit 439. The interrupt priority logic is substantially the same as the interrupt priority logic shown in the IBM Technical Disclosure Bulletin, Vol. 18, No. 3, August 1975, pages 901-904, except that in FIG..8 it is shown in positive logic. Hence, inverters 502 and 503 are added for polarity purposes.

Once the CP has completed the servicing of the Interrupt Level 5 Request that came from the MSP, the storage latch 435 is reset. After storage latch 435 has been reset the enable latch 432 is set again so that a subsequent interrupt coming from the MSP can be passed by AND circuit 433 and stored in latch 435. Latch 435 is reset under control of AND circuit 434. AND circuit 434 receives control bits from the port register 501 and the Port Instruction signal.

Figure 9:
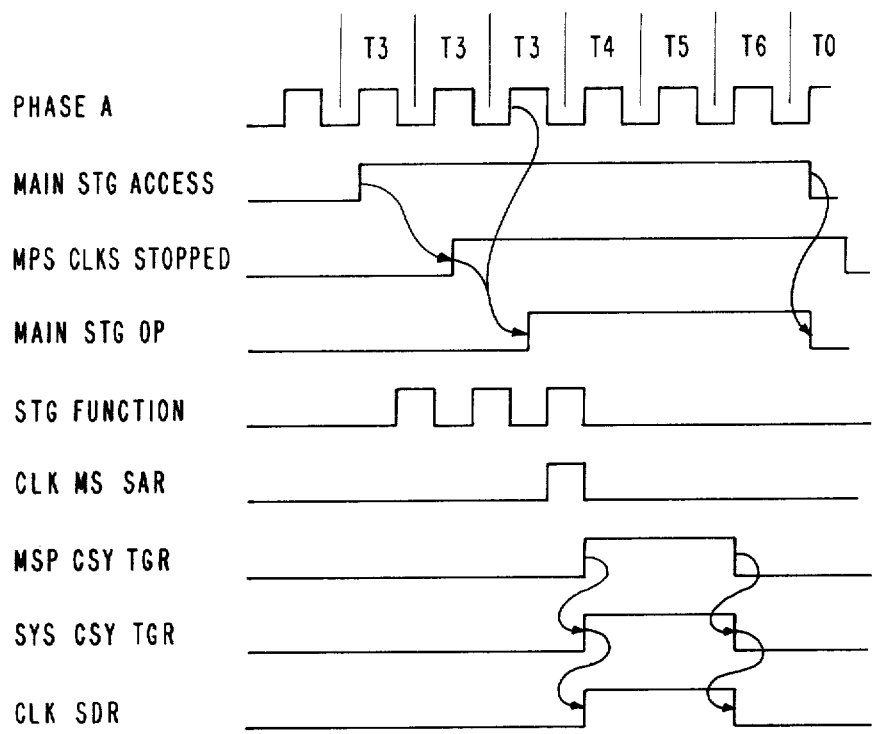
FIG. 9 is a timing diagram illustrating timings during a main storage access by the control processor CP.
Figure 10:
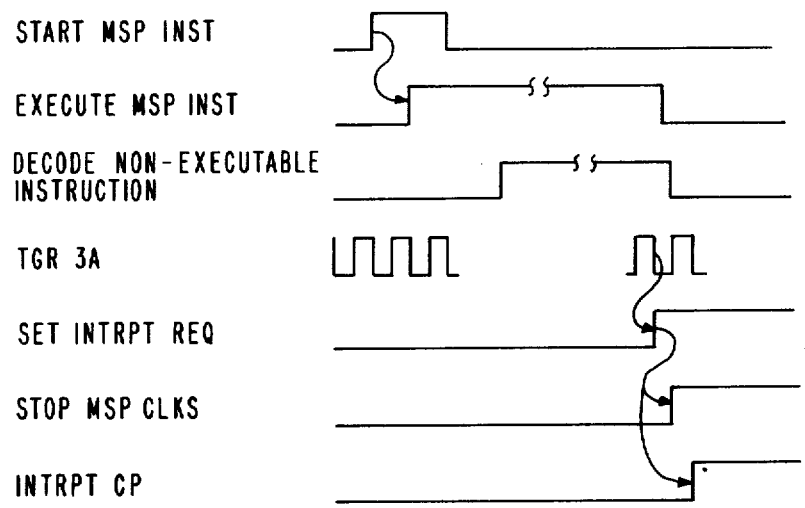
FIG. 10 is a timing diagram illustrating timings during a main storage processor MSP non-executable instruction.

There are two additional controls which can generate the Interrupt Request Level 5 signal. The I/O devices can pass an Interrupt Request Level 5 signal directly into OR circuit 439. Additionally, the control processor 300 can set a CP Interrupt Request Level 5 latch 438 by loading the port register 501 with control bits so as to condition AND circuit 436 which controls the setting of latch 438. The Port Instruction signal is also applied to AND circuit 436 as well as to AND circuit 437 which controls the resetting of latch 438. AND circuit 437 is conditioned by control bits in port register 501. The set output of latch 438 is applied to OR circuit 439. Hence, an I/O Immediate instruction can load the port register 501 to either set or reset latch 438. Latch 438 enables the CP to allow a program operating on another interrupt level in the CP to be serviced on the Interrupt Level 5. Although, as previously stated, a separate register could be provided in the MSP or in the CP for the enabling function, the port register 501 which is loadable by an I/O Immediate instruction executed by the CP eliminates the need for an additional register. The port register 501 is substantially the same as the channel register 314 in FIG. 9 of U.S. Pat. No. 3,972,023. It is thus seen that the Interrupt Request Level 5 enable logic facilitates the handling of the Interrupt Request Level 5 from the MSP by logic which has been available heretofore in the channel.

What is claimed is:

1. In an asymmetrical multiprocessor system comprising:
   an addressable control storage containing microinstructions including microinstructions for controlling initiation of operation of a macroprocessor, a microprocessor connected to address said control storage to fetch and execute microinstructions therefrom,
   an addressable main storage containing macroprocessor instructions, and
   a macroprocessor connected under control of said microprocessor for initiation of fetching and executing macroinstructions by microinstructions executed by said microprocessor.

2. The multiprocessor system of claim 1 further comprising:
  control means in said macroprocessor for generating a stop signal in response to a predefined condition occurring in said macroprocessor indicating that said macroprocessor should suspend operation,
  first means responsive to said stop signal for suspending fetching and executing said macroinstructions, and second means responsive to said stop signal for interrupting said microprocessor to inform said microprocessor of said predefined condition occurring in said macroprocessor.

3. The multiprocessor system of claim 2 wherein said predefined condition is detection of a non-executable macroinstruction.

4. The multiprocessor system of claim 3 where said non-executable macroinstruction is an I/O instruction.

5. The multiprocessor system of claim 3 where said non-executable instruction is a supervisor call instruction.

6. The multiprocessor system of claim 2 wherein said predefined condition is a check condition occurring in said macroprocessor.

7. The multiprocessor system of claim 2 wherein said predefined condition is a service request from said microprocessor.

8. The multiprocessor system of claim 1 wherein said microprocessor and said macroprocessor share a common main storage access path.

9. In an asymmetrical multiprocessor system including an addressable main storage containing instructions and data, a main storage processor for executing instructions fetched from said main storage, an addressable control storage for storing microinstructions and data, a control processor for executing microinstructions fetched from said control storage, the improvement comprising: selectively operable main storage processor control means for controlling fetching and execution of instructions from said main storage,
  main storage processor instruction decode means connected under control of said main storage processor control means for decoding instructions fetched from said main storage and generating a non-executable instruction signal upon decoding a non-executable instruction,
  inhibit means connected to said main storage processor instruction decode means and to said main storage processor control means to cause said main storage processor control means to inhibit fetching of instructions from said main storage in response to said non-executable instruction signal from said main storage processor instruction decode means,
  interrupt request means responsive to said non-executable instruction signal for generating an interrupt request signal,
  control processor control means for controlling microinstruction processing in said control processor and responsive to said interrupt request signal to switch microinstruction processing to a set of microinstructions for interpreting said non-executable instruction.

10. The asymmetrical multiprocessor system of claim 9 wherein said control processor control means upon completion of interrupting said non-executable instruction generates a signal for causing said main storage processor control means to continue fetching instructions from main storage.

11. In an asymmetrical multiprocessor system including an addressable main storage containing instructions and data, a main storage processor for executing instructions fetched from said main storage, an addressable control storage for storing microinstructions and data, a control processor for executing microinstructions fetched from said control storage, the improvement comprising:
  main storage addressing means for addressing main storage and connected for use by said main storage processor and said control processor,
  main storage processor control means for controlling use of said main storage addressing means by said main storage processor in the absence of a main storage access signal from said control storage indicating an intention to use said main storage addressing means, and main storage access signal generating means in said control processor for generating a main storage access signal.

12. The asymmetrical multiprocessor system of claim 11
  wherein said main storage access signal generating means generates a main storage access signal in response to said control processor executing a main storage microinstruction.

13. The asymmetrical multiprocessor system of claim 12 wherein said main storage microinstruction is a write main storage microinstruction.

14. The asymmetrical multiprocessor system of claim 12 wherein said main storage microinstruction is a read main storage microinstruction.

15. The asymmetrical multiprocessor system of claim 11 further comprising:
  I/O devices connected under control of said control processor and includng means for generating a cycle steal request signal when requiring access to said main storage, said main storage access signal generating means being responsive to said cycle steal request signal to generate a main storage access signal.

* * * * *